United States Patent
Stamm et al.

[15] 3,635,544
[45] Jan. 18, 1972

[54] PHOTOCHROMIC POLYMER MATRIX

[72] Inventors: Robert Franz Stamm; Jacob Solomon Brinen, both of Stamford; Evalyn Hosterman Tennant, Old Greenwich; Frederick Halverson, Stamford, all of Conn.

[73] Assignee: American Cyanamid Company, Stamford, Conn.

[22] Filed: Oct. 21, 1968

[21] Appl. No.: 769,028

Related U.S. Application Data

[63] Continuation-in-part of Ser. No. 332,752, Dec. 23, 1963, abandoned, Continuation-in-part of Ser. No. 332,921, Dec. 23, 1963, abandoned.

[52] U.S. Cl.................350/160, 252/301.2, 264/1, 156/99, 156/100, 161/1, 161/192, 161/410
[51] Int. Cl..........................G02c 7/10, G02b 5/28
[58] Field of Search ..........252/300, 301.2; 264/1, 2, 28, 264/109; 156/99, 100; 161/408, 192, 409, 410, 1; 350/160 P; 96/90 PC; 256/301.2

[56] References Cited

UNITED STATES PATENTS

| | | | |
|---|---|---|---|
| 1,884,529 | 10/1932 | Benner et al. | 264/109 |
| 2,444,976 | 7/1948 | Brown | 161/408 |
| 2,869,215 | 1/1959 | Smith | 264/28 |
| 3,214,382 | 10/1965 | Windsor | 252/301.2 |
| 3,214,383 | 10/1965 | Moore et al. | 252/301.2 |
| 3,270,639 | 9/1966 | Windsor | 350/160 |

*Primary Examiner*—William J. Van Balen
*Attorney*—Samuel Branch Walker

[57] ABSTRACT

A fast-acting photochromic filter—i.e., a filter whose optical density in the visible light range of 4,000 to 7,500 Angstroms—which is room temperature stable, that is from at least about 20° C. to 80° C., consists of (1) a solid optically transparent polymeric matrix, (2) essentially free from noncombined or molecular oxygen, and preferably protected from diffusion of atmospheric oxygen, in which is (3) dispersed, in solid solution, at least one light absorbing compound having a polynuclear conjugated condensed aromatic ring structure, whose molecules are capable of assuming a metastable triplet state by a process of intersystem crossing (not necessarily of the moiety which assumes the metastable triplet state) and in the triplet state, because of closer triplet states, has energy absorption bands which occur at lower energies (larger wavelengths) than the singlet-singlet absorption for such molecules. A synergic component may also be used as a physically adjacent moiety or molecule in which intersystem crossing occurs more readily than in the light absorbing compound, and which transfers triplet energy to the photochromic moiety. The absorption of singlet-singlet activating energy can be in the synergistic moiety, for single energy transfer, or in the photochromic moiety itself, with transfer of the singlet energy to the synergic moiety, intersystem crossing therein, to triplet energy, and transfer back of the triplet energy to the photochromic moiety, or double energy transfer. Two or more photochromic compounds, with different absorption spectra block "windows" to give absorption over a desired range. Protective glass layers on each side of a photochromic matrix give physical protection, exclude oxygen, and may also be filters for desired ultraviolet and infrared ranges. Polymerization by ionizing radiation gives freedom from interferrants, such as catalysts residues. Evacuation during processing, or heating in vacuum after formation of the filter aids in removal of uncombined oxygen.

17 Claims, 2 Drawing Figures

COMPONENT B
$S_B''$ - - - - - - - -

INVENTORS.
ROBERT FRANZ STAMM
JACOB SOLOMON BRINEN
EVALYN HOSTERMAN TENNANT
FREDERICK HALVERSON

BY
ATTORNEY

PHOTOCHROMIC POLYMER MATRIX

CROSS REFERENCES TO RELATED APPLICATIONS

This is a continuation-in-part of application, Ser. Nos. 332,752 and 332,921, both filed Dec. 23, 1963, and both abandoned in favor hereof.

This invention relates to chromatic aspects of metastable electronic states in polynuclear and condensed ring-conjugated aromatic carbocyclic and heterocyclic systems and devices for utilizing the extremely fast color changes, particularly the reversible color changes at high levels of illumination of certain photochromic compounds, which color changes result from optical absorption of energy by molecules occupying metastable electronic states of one or more molecular species. The color change resulting from absorption of radiation is commonly referred to as PHOTOCHROMISM, or sometimes, and less properly, phototropism.

The more common photochromic compounds known to the prior art have a photochromic characteristic resulting from a molecular rearrangement or shift which is necessarily comparatively slow. Some of the common types involve rupturing chemical bonds, or cis-trans, or syn-anti isomerism. The slowness of these reactions is attributable to the time required for the relocation of atoms or fragments of molecules which are massive on a molecular scale. These reactions are temperature dependent, have finite and sometimes large energies of activation, and may not be reversible at low temperatures. Because of the characteristics of the reactions involved, sometimes the photochromic materials are degraded during the process.

The compounds used in the present invention, which for purposes of conciseness, will be referred to as photochromic materials, sometimes abbreviated as PM, have their photochromic activity dependent upon a physical phenomena involving a triplet-triplet absorption. This process in turn involves only the shifting about of the electron cloud of the molecule, and hence is extremely rapid and has the following major advantages:

a. The color change induced by the action of light occurs very quickly (within several microseconds) if the exciting light is intense and has a fast rise time.

The optical density, sometimes abbreviated O.D., is the logarithm to the base 10 of the ratio of incident light to transmitted light (O.D. $= \log_{10}(I_o/I)$ where $I_o=$ intensity of incident ray and $I=$ intensity of transmitted ray. Another equivalent definition is O.D. $= \log_{10}(1/T)$ where T is the transmittance $= (I/I_o)$.

b. The optical density change produced by the action of the light, in the preferred embodiments, varies approximately linearly with the intensity of the incident light at levels of light intensity prevailing in sunlight (2–3 calories/cm.$^2$/minutes). As the incident light intensity increases, the fraction of photochromic molecules remaining in the ground state decreases, and as the number available for conversion to the triplet state decreases, the optical density approaches a limit asymptotically.

Also, when using flash excitation from air-filled flash lamps which take 40 microseconds to reach peak intensity, and have lifetimes (time during which the flash has intensity greater than one-third the peak intensity) of 50 microseconds for the flash, and which provide total intensity levels of 0.003 to 0.011 cal./cm.$^2$/flash at the sample, the change in optical density produced at the wavelength of maximum color development is directly proportional to the intensity of the incident light. Thus, under such conditions of flash excitation, increasing the incident intensity by a factor of 2 will also increase the optical density by a factor of 2.

c. The color development attributable to component I in a given matrix can be synergistically both enhanced and augmented by a second component II present in the same matrix. This is made possible by means of single and double energy transfers between unlike molecules in a solid matrix when the energy levels of molecular species II bear a preferred relationship relative to those of species I.

d. If the photochromic material is to be incorporated in an optically clear plastic matrix, and if it is desirable or necessary to dissolve the active material in the monomer and then polymerize the monomer to form the plastic matrix, the use of ionizing radiation instead of conventional polymerization catalysts produces a superior photochromic polymeric filter.

e. In addition to the high speed of color development (microseconds) and the relatively rapid rate of color decay, certain of these materials also exhibit photochromism in the presence of sunlight. Thus, the range of usages is extensive and includes such applications as the following:

| Steady-State Illumination | Flash Illumination |
| --- | --- |
| Sunglasses, welding goggles | Protection against flash blindness and chlorioretinal burns |
| Skylights | |
| Automobile windows and windshields | by light from nuclear bursts: Safety goggles for same |
| Windows for buildings and dwellings | Windows and windshields for aeroplanes for same |
| Windows for space vehicles and aircraft | Safety sight glasses for observational type optical devices |
| Recording tapes with fast readout | (telescopes, binoculars, range finders) |
| Paints and surface coatings for novelty effects | Recording tapes with fast readout |
| Energy measuring devices | Energy measuring devices |
| Safety glasses for scientific and industrial use in working around intense light sources | Safety glasses for scientific use in working around intense light sources of short duration |
| Display windows for stores | |

There have been several papers published which disclose color changes induced in organic molecules by the action of light and which require a metastable electronic state (triplet state) as the key to the mechanism. D. P. Craig and I. G. Ross, "The Triplet-Triplet Absorption Spectra of Some Aromatic Hydrocarbons and Related Substances," J. Chem. Soc. 1954, 1589–1969 (London) disclose achieving this phenomenon of color development at 78° K. (liquid nitrogen temperature) with the active species in a rigid, organic glass when they irradiated the sample with light from a 1,000 watt quartz mercury arc. The substances studied which produced the effect were:

| Substance | Lifetime $\tau_m$ (sec.) | Color Developed on Irradiation with Ultraviolet |
| --- | --- | --- |
| Naphthalene | 2.5 | Yellow |
| Phenanthrene | 3.3 | Yellow |
| Fluorene | 5.7 | Yellow |
| Chrysene | 2.6 | Red |
| 1,2-Benzanthracene | 0.3 | Yellow |
| 1,2,5,6-Dibenzanthracene | 1.4 | Red-Purple |
| Pyrene | 0.4 | Yellow |
| 3,4-Benzpyrene | 0.3 | Yellow |
| Quinoline | 0.3 | Yellow |
| iso-Quinoline | 1.3 | Yellow | where $\tau_m$ is the mean lifetime of the metastable state.

The mean lifetime is the time for the population to fall to the fraction $1/e$ of the population at the initial state, in the absence of the production of new members of the population. *e* is the base of Naperian or natural logarithms, 2.71828. The value of $1/e$ is 0.36787.

At a later date, G. Porter and M. W. Windsor "The Triplet State in Fluid Media," Proc. Roy. Soc. A245, 238–258 (1958) established that momentary color changes could be induced in dilute solutions of these same molecules (and other similar molecules) by irradiating the solutions with a short, intense burst of light from a flash lamp. In solutions, at room temperature, the color developed generally lasted no longer than 1 to 5 milliseconds since the metastable (triplet) molecules react with each other quickly when they are free to migrate. The solutions are very dilute, and the light path so long that such color development is of interest principally as a scientific curiosity.

Because the triplet state is so reactive, it has been considered necessary to operate at low temperatures, such solutions—of liquid nitrogen, or at extremely dilute solutions —such that the absorption spectra have more theoretical than real significance.

We have now found that the molecules of polynuclear-conjugated condensed aromatic-ring systems meeting requirements for useful absorption in the metastable states are stabilized at room temperatures —about 20° C. —and over a range of at least −186° C. to temperatures at least about +80° C., and in some plastic matrices and some inorganic matrices, to considerably higher temperatures, by incorporating them into a solid transparent matrix which is free from reactive sites which would react with the PM molecules in the very active triplet state, and deactivate them.

Compounds having an unsubstituted ring system, herein shown by a specific example, are listed by the name and formula given in the Ring Index, second edition, A. M. Patterson, L. T. Capell and D. F. Walker, American Chemical Society, Washington, D.C., 1960, with the abbreviation "RRI . . ." giving the revised Ring Index serial number. The abbreviation R.I.S. refers to the Ring Index Supplement, L. T. Capell and D. F. Walker, American Chemical Society, Washington, D.C., 1963. A Roman Numeral is assigned for substituted compounds. Where a Roman Numeral or a RRI number is assigned, the empirical and structural formula is given but once.

Compounds illustrative of those useful in the present invention and which give preferred absorption in the visible light region and are shown by specific examples, are shown in the following Table I:

TABLE 1

| Chemical name, revised ring Index No. and Example No. | Empirical formula | Structural formula |
|---|---|---|
| 1,10-phenanthroline RRI 3480, Example 1 | $C_{12}H_8N_2$ | |
| 1,7-phenanthroline RRI 3478, Example 2 | $C_{12}H_8N_2$ | |
| Anthracene RRI 3618, Example 3 | $C_{14}H_{10}$ | |
| Phenanthrene RRI 3619, Example 4 | $C_{14}H_{10}$ | |
| The benidine (4-azapyrene) RRI 5178, Examples 5, 6. | $C_{15}H_9N$ | |
| Pyrene RRI 5262, Example 7 | $C_{16}H_{10}$ | |

| Chemical name, revised ring Index No. and Example No. | Empirical formula | Structural formula |
|---|---|---|
| Benzo[kl]xanthene RRI 5230, Examples 8, 9 | C₁₆H₁₀O | 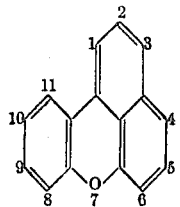 |
| Benzo[b]naphtho[1,2-d]-thiophene RRI 4684, Example 10. | C₁₆H₁₀S | 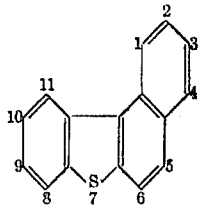 |
| Dibenzo[f,h]quinoxaline RRI 5010, Example 11 | C₁₆H₁₀N₂ | 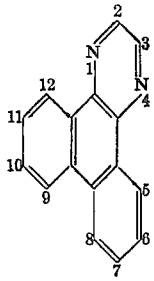 |
| 7H-benz[de]anthracen-7-one I (from RRI 5261), Example 12. | C₁₇H₁₀O | 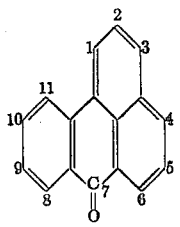 |
| Benz[a]acridine RRI 5144, Examples 13, 14 | C₁₇H₁₁N | 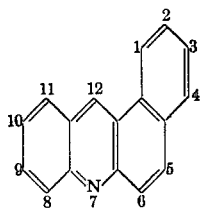 |
| Benz[b]acridine RRI 5140, Examples 15, 16, 79, 96, 100. | C₁₇H₁₁N | 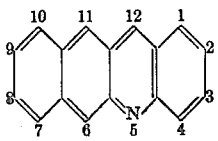 |
| Benz[c]acridine RRI 5148, Examples 17, 18 | C₁₇H₁₁N | 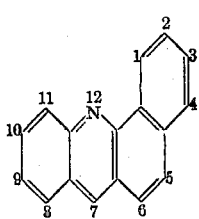 |
| Benz[b]acridin-12(5H)-one II, Examples 19, 20, 98, 102, 103. | C₁₇H₁₁NO | 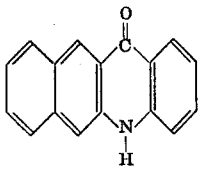 |

| Chemical name, revised ring Index No. and Example No. | Empirical formula | Structural formula |
|---|---|---|
| Benzo[ghi]fluoranthene RRI 6092, Exampel 21 | $C_{18}H_{10}$ | 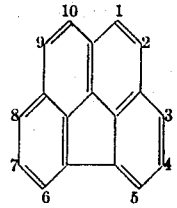 |
| Benz[a]anthracene RRI 5253, Example 22 | $C_{18}H_{12}$ | 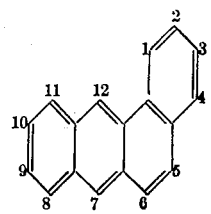 |
| Chrysene RRI 5254, Example 23 | $C_{18}H_{12}$ | 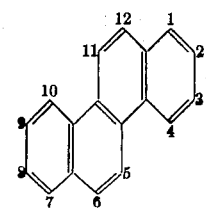 |
| Benzo[b]naphtho[2,3-f][1,4]-diazocine RIS 9111, Example 24. | $C_{18}H_{12}N_2$ | 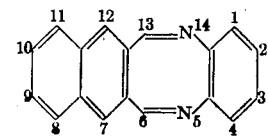 |
| 2-Aminochrysene III, Example 25 | $C_{18}H_{13}N$ | 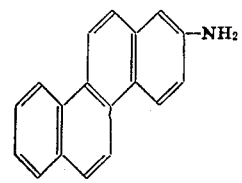 |
| Benz[e]acephenanthrylene RRI 6070, Example 26. | $C_{20}H_{12}$ | 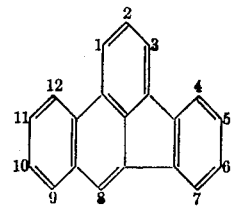 |
| Benzo[a]pyrene RRI 6399, Example 27 | $C_{20}H_{12}$ | 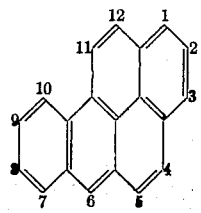 |
| Benzo[e]pyrene RRI 6400, Examples 28 | $C_{20}H_{12}$ | 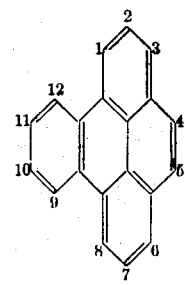 |

| Chemical name, revised ring Index No. and Example No. | Empirical formula | Structural formula |
|---|---|---|
| Dibenzo[a,c]phenazine RRI 6221, Example 29 | C₂₀H₁₂N₂ | 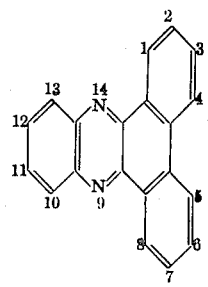 |
| Dibenzo[a,h]phenazine RRI 6223, Examples 30, 31, 32, 80, 91, 98. | C₂₀H₁₂N₂ | 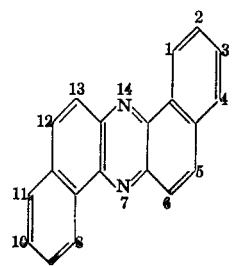 |
| Dibenzo[a,j]phenazine RRI 6222, Examples 33, 79 | C₂₀H₁₂N₂ | 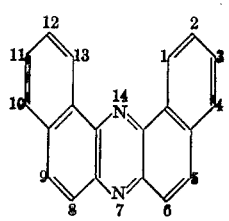 |
| Dinaphtho[2,1-b:1',2'-d]-furan RRI 5045, Example 34. | C₂₀H₁₂O | 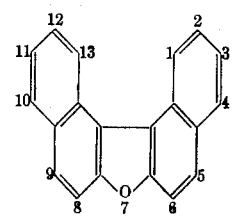 |
| Dinaphtho[1,2-b:1',2'-e]-p-dioxin RRI 6246, Example 35. | C₂₀H₁₂O₂ | 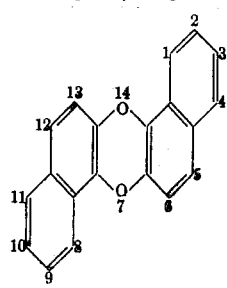 |
| 7H-Dibenzo[c,g]carbazole RRI 5000, Example 36 | C₂₀H₁₃N | 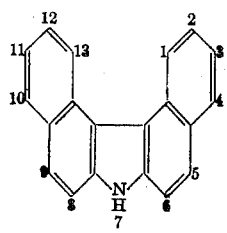 |
| 7H-Dibenzo[c,h]-phenothiazine RRI 6170, Example 37. | C₂₀H₁₃NS | 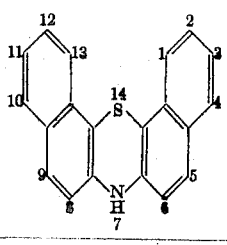 |

| Chemical name, revised ring Index No. and Example No. | Empirical formula | Structural formula |
|---|---|---|
| Benzo[a]pyrido[1′2′:1.2]-imidazo[4,5-c]phenazine IV, Examples 38, 39. | $C_{21}H_{12}N_4$ | 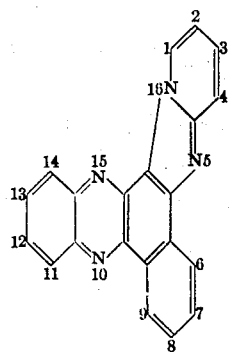 |
| Dibenz[a,h]acridine RRI 6298, Examples 40, 41, 96, 100, 102, 103. | $C_{21}H_{13}N$ | 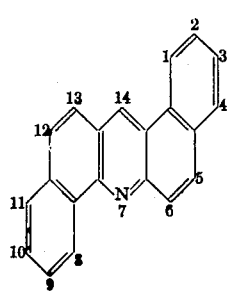 |
| Dibenz[a,j]acridine RRI 6296, Examples 42, 43 | $C_{21}H_{13}N$ | 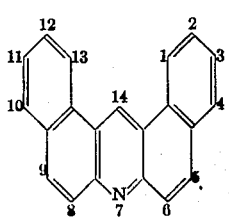 |
| Benzo[ghi]perylene RRI 7036, Examples 44, 45, 102, 103. | $C_{22}H_{12}$ | 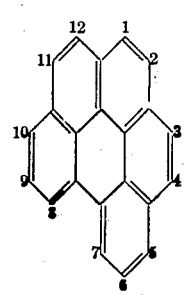 |
| Indeno[1,2,3-cd]pyrene (orthophenylene pyrene) R.I.S. 9508, Examples 46, 47. | $C_{22}H_{12}$ | 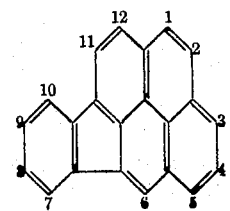 |
| Benzo[b]chrysene RRI 6379, Examples 48, 49, 90, 85, 86, 87. | $C_{22}H_{14}$ | 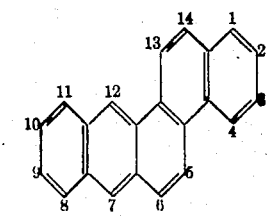 |

| Chemical name, revised ring Index No. and Example No. | Empirical formula | Structural formula |
|---|---|---|
| Dibenz[a,c]anthracene RRI 6381, Example 50 | $C_{22}H_{14}$ | 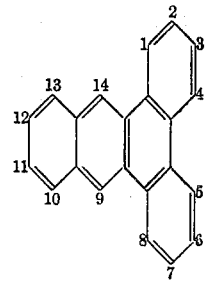 |
| Dibenz[a,h]anthracene RRI 6383, Examples 51, 52, 53, 54, 78, 79, 80, 81, 82, 83, 84, 88, 89, 90, 97, 99, 101. | $C_{22}H_{14}$ | 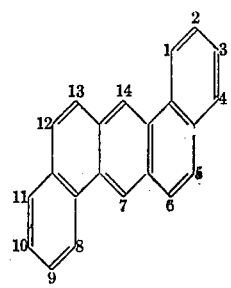 |
| Picene RRI 6384, Example 55 | $C_{22}H_{14}$ | 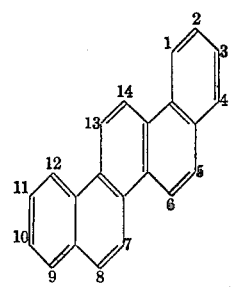 |
| Dibenzo[c,g]phenanthrene RRI 6387, Example 56 | $C_{22}H_{14}$ | 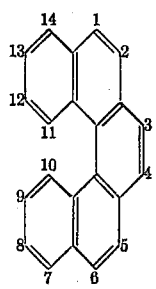 |
| 10-methylbenzo[g]chrysene V, Example 57 | $C_{23}H_{16}$ | 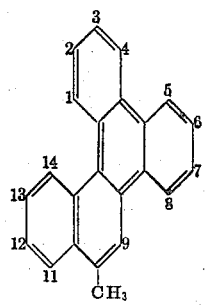 |
| 10-methylbenzo[g]chrysene-1,3,5-trinitrobenzene complex VI, Example 58. | $C_{29}H_{19}N_3O_6$ | |

| Chemical name, revised ring Index No. and Example No. | Empirical formula | Structural formula |
|---|---|---|
| Coronene RRI 7392, Examples 59, 60 | $C_{24}H_{12}$ | 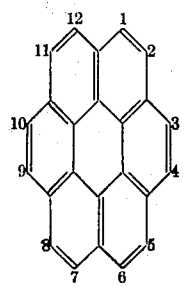 |
| Dibenzo[def,p]chrysene RRI 7030, Example 61 | $C_{24}H_{14}$ | 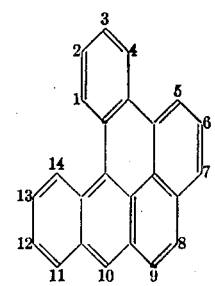 |
| Naphtho[1,2,3,4-def]-chrysene RRI 7026, Examples 62, 63, 97. | $C_{24}H_{14}$ | 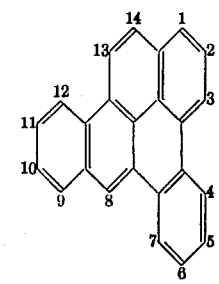 |
| Dibenzo[fg,op]-naphthacene RRI 7022, Examples 64, 65. | $C_{24}H_{14}$ | 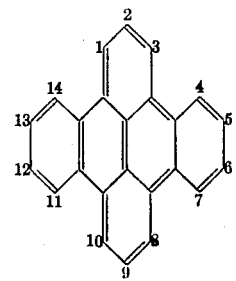 |
| Dibenzo[b,def]chrysene RRI 7028, Example 66 | $C_{24}H_{14}$ | 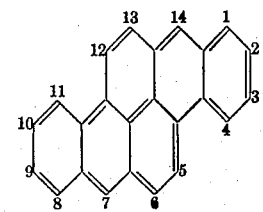 |
| Benzo[rst]pentaphene RRI 7029, Examples 67, 68, 79. | $C_{24}H_{14}$ | 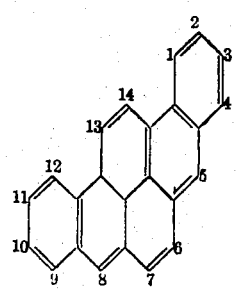 |

| Chemical name, revised ring Index No. and Example No. | Empirical formula | Structural formula |
|---|---|---|
| Tribenzo[a,c,i]phenazine RRI 6915, Example 69 | $C_{24}H_{14}N_2$ | 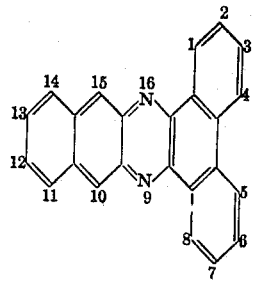 |
| 2,3-Diphenylbenzo[f]quinoxaline VII, Example 70 | $C_{24}H_{16}N_2$ | 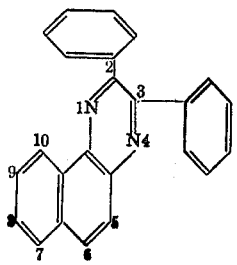 |
| Dibenzo[b,k]chrysene RRI 7002, Example 71 | $C_{26}H_{16}$ | 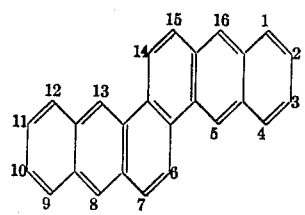 |
| Dibenzo[g,p]chrysene RRI 7010, Example 72 | $C_{26}H_{16}$ | 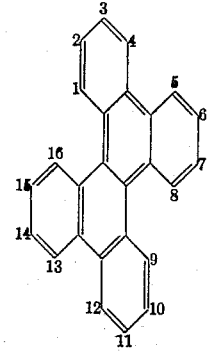 |
| Benzo[a]coronene R.I.S. 9650, Examples 73, 74, 101, 106. | $C_{28}H_{14}$ | 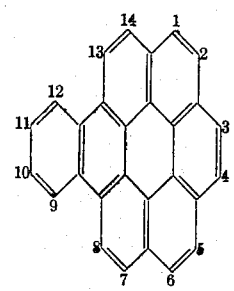 |

| Chemical name, revised ring Index No. and Example No. | Empirical formula | Structural formula |
| --- | --- | --- |
| Dibenzo[h,rst]pentaphene RRI 7381, Examples 75, 76, 99. | C₂₈H₁₆ | 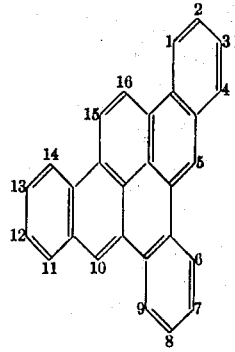 |
| Benzo[g]chrysene picrate VIII, Example 77 | C₂₈H₁₇N₃O₇ | |
| Naptho[2,3-a]coronene R.I.S. 9678, Examples 92, 93. | C₃₂H₁₆ | 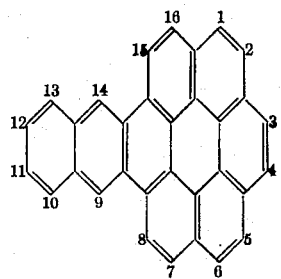 |
| Acenaphtho[1,2-b]-benzo[f]quinoxaline RRI 6816, Example 94. | C₂₂H₁₂N₂ | 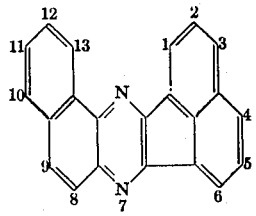 |
| Benzo[a]naphtho-[8,1,2-cde]naphthacene RRI 7373, Example 95. | C₂₈H₁₆ | 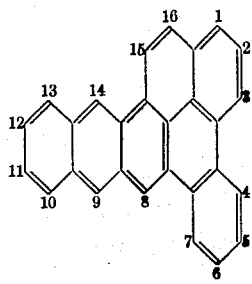 |
| Tribenzo[b,n,pqr]-perylene RRI 7524, Example 105. | C₃₄H₁₈ | 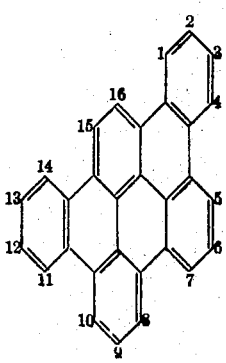 |

| Chemical name, revised ring Index No. and Example No. | Empirical formula | Structural formula |
|---|---|---|
| Dibenzo[a,g]coronene RIS 9680, Example 104 | $C_{32}H_{16}$ | 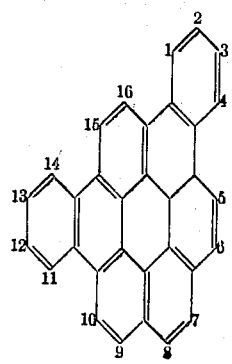 |

Illustrative of other compounds giving useful spectra are the following:

TABLE 2.—ADDITIONAL REPRESENTATIVE COMPOUNDS WHICH EXHIBIT T'T ABSORPTION

| Chemical name, revised ring index number | Empirical Formula | Structural Formula |
|---|---|---|
| Permidine RRI 3398 | $C_{11}H_{9}N_{2}$ | |
| Acenaphthenequinone | $C_{12}H_{6}O_{2}$ | |
| Acenaphthylene RRI 3133 | $C_{12}H_{8}$ | |
| Fluoren-9-one (RRI 3127) (Parenthesis if closely related to RRI number). | $C_{13}H_{8}O$ | |
| Thioxanthen-9-one (RRI 3607) | $C_{13}H_{8}OS$ | |
| Phenalen-1-one hydrazone (RRI 3620) | $C_{13}H_{10}N_{2}$ | |

| Chemical name, revised ring index number | Empirical Formula | Structural Formula |
|---|---|---|
| 3-phenylimidazo[1,5-a]-pyridine (RRI 1200) | $C_{13}H_{10}N_2$ | 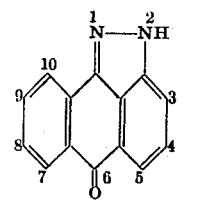 |
| Anthra[1,9-cd]pyrazol-6(2H)-one (Pyrazolanthrone) (RRI 4453) | $C_{14}H_8N_2O$ | 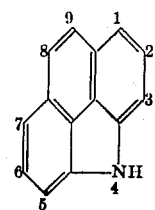 |
| 4H-benzo[def]carbazole 4,5-iminophenanthrene) RRI 4588 | $C_{14}H_9N$ | 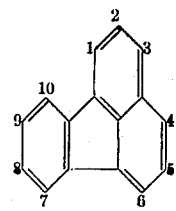 |
| Fluoranthene RRI 4799 | $C_{16}H_{10}$ | 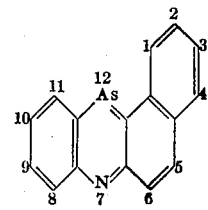 |
| Benzo[a]phenarsazine RRI 4902 (and c isomer) RRI 4903 | $C_{16}H_9As_{10}N$ | 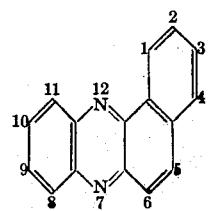 |
| Benzo[a]phenazine RRI 5007 (and b isomer) RI 5001. | $C_{16}H_{10}N_2$ | 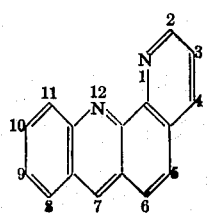 |
| Benzo[b][1,10]-phenanthroline RRI 5066 (and b-4,7 RRI 5067 b-1,7 RRI 5068 j-1,7 RRI 5065 isomers). | $C_{16}H_{10}N_2$ | |

| Chemical name, revised ring index number | Empirical Formula | Structural Formula |
|---|---|---|
| Dibenzo[f,h]cinnoline RRI 5009, dibenzocinnoline (all isomers). | $C_{16}H_{10}N_2$ | |
| Naphtho[2,3-g]phthalazine RRI 5000 naphthophthalazine (all isomers). | $C_{16}H_{10}N_2$ | |
| Naphtho[2,3-f]quinoxaline RRI 5004, naphthoquinoxaline (all isomers) | $C_{16}H_{10}N_2$ | |
| Benzo[b]naphtho[2,3-d]-furan (2,3-benzodiphenylene oxide) RRI 4636 | $C_{16}H_{10}O$ | |
| Benzo[b]naphtho[2,1,-d]-thiophene (3,4-benzodibenzothiophene) RRI 4687 | $C_{16}H_{10}S$ | |
| Benzo[b]naphtho[2,3-e]-p-dithiin [benz(β)-thianthrene] (and α isomer) | $C_{16}H_{10}S_2$ | |
| 3-aminofluoranthene (RRI 4799) | $C_{16}H_{11}N$ | |
| 9-anthryl methyl ketone (9-acetylanthracene) (RRI 3618) | $C_{16}H_{12}O$ | |
| Benzo[c]phenanthridine RRI 5153 | $C_{17}H_{11}N$ | |

| Chemical name, revised ring index number | Empirical Formula | Structural Formula |
|---|---|---|
| Dibenzo[f,h]quinoline RRI 5160 | C₁₇H₁₁N | |
| 9-phenylcarbazole (RRI 2927) | C₁₈H₁₃N | |
| 10-phenylphenothiazine (RRI 3314) | C₁₈H₁₃NS | |
| Dibenzo[a,i]phenarsazine RRI 6133, dibenzophenarsazine (all isomers). | C₂₀H₁₂AsN | |
| Benzo[f]naphtho[1,2-b]-[1,7]naphthyridine (benzo[h]quino[3,4-b]-quinoline) RRI 6270 (and [f]-[3,4b] isomer, RRI 6267). | C₂₀H₁₂N₂ | |
| Dibenzo[b,j][4,7]-phenanthroline RRI 6262 (and b,i-1,10 b,j-4,10 b,i-4,10 isomers). | Same | |
| Dibenzo[b,i]phenazine RRI 6217, dibenzophenazine (all isomers) ([a,i] RRI 6218) (see Examples 29 for [a,c] 30 etc. for [a,h] 33, 79 for [a,j]). | do | |

| Chemical name, revised ring index number | Empirical Formula | Structural Formula |
|---|---|---|
| Dinaphtho[2,3-b:2',3'-d]-furan, RRI 5938 (dinaphthalene oxide) dinaphthofuran (all other isomers) (see Example 34 for [2,1-b:1',2'-d], RRI 5945). | $C_{20}H_{12}O$ | |
| Benzo[b]phenanthro[2,3-d]-thiophene (dibenzo-[b,i]thiophanthrene) RRI 5975 (and b,g isomer, benzo[b]phenanthro[3,2-d]-thiophene, RRI 5976) | $C_{20}H_{12}S$ | |
| Dinaphtho[2,3-b:2',3'-d]thoiphene RRI 5974, dinaphthothiophene (all isomers). | Same | |
| Dibenzo[b,i]thianthrene RRI 6251, dibenzthianthrene (all isomers). | $C_{20}H_{12}S_2$ | |
| 13H-dibenzo[a,h]-carbazole RRI 5981 (and 7H-a,g RRI 5901, 7H a,i RRI 5899, isomers) (see Example 36 for 7H-c,g). | $C_{20}H_{13}N$ | |
| 7H-dibenzo[c,h]phenoselenazine RRI 6176 | $C_{20}H_{13}NSe$ | |
| 7H-dibenzo[a,j]phenothiazine RRI 6167 (and a, h isomer) (see Example 37 for 7H-[c,h]). | $C_{20}H_{13}NS$ | |
| 2,2'-binaphthyl (cf. RRI 1754) | $C_{20}H_{14}$ | |
| 7,14-dihydrodibenzo[a,i]phenazine (RRI 6218), 7,14-dihydrodibenzophenazine (all isomers). | $C_{20}H_{14}N_2$ | |

| Chemical name, revised ring index number | Empirical Formula | Structural Formula |
|---|---|---|
| 12H-dibenzo[b,h]-fluorene RRI 6045, dibenzfluorene (all isomers). | $C_{21}H_{14}$ | |
| Dibenz[b,i]acridine RRI 6287, dibenzacridine (all other isomers) (see Examples 42, 43 for [a,j] 40, 41 etc. for [a,h]). | $C_{21}H_{13}N$ | |
| Dibenzo[c,j]phenanthridine RRI 6290 (and c,i; c,k). | Same | |
| Tris[p-(dimethylamino)-phenyl]borane(III) | $C_{24}H_{30}BN_3$ | $[(CH_3)_2N-\phantom{xx}-]_3B$ |
| Dibenzo[def,mno]-chrysene-6,12-dione (anthanthrone) (RRI 7033). | $C_{22}H_{10}O_2$ | |
| Acenaphtho[1,2-b]benzo-[g]quinoxaline RRI 6813 (see Example 94 for [1,2-b]-[f]isomer). | $C_{22}H_{12}N_2$ | |
| Dibenz[a,j]anthracene RRI 6382, dibenzanthracene (and other isomers) (see Example 50 for [a,c] Example 51 etc. for [a,h]). | $C_{22}H_{14}$ | |
| Dibenzo[b,g]phenanthrene RRI 6380, dibenzophenanthrene (and other isomers) (see Example 56 for [c,g]). | $C_{22}H_{14}$ | |
| 2,5-di-2-naphthyl-1,3,4-oxadiazole | $C_{22}H_{14}N_2O$ | |

| Chemical name, revised ring index number | Empirical Formula | Structural Formula |
|---|---|---|
| 9-(p-dimethylaminobenzylidene)fluorene (from RRI 3127). | $C_{22}H_{19}N$ | |
| Diacenaphtho[1,2-b:1',2'-d]thiophene (Di-1,8-naphthalenethiophene) RRI 7122. | $C_{24}H_{12}S$ | |
| Rubicene RRI 7167 | $C_{26}H_{14}$ | |
| Benzo[1,2,3-gh:4,5,6-g'h']diphenanthridine RRI 7308 | $C_{26}H_{14}N_2$ | |
| 8,16-pyranthrenedione (pyranthrone) (from RRI 7526). | $C_{30}H_{14}O_2$ | |
| Pyranthrene RRI 7526 | $C_{30}H_{16}$ | |

Also included are the lower alkyl substituted derivatives formed by substituting one or more lower alkyl groups on the compounds listed above and listed in table 1.

Some compounds have an absorption of the T'-T-type at least part of which is outside of the visible range and, hence, are primarily useful in the visible range as synergistic additives for absorption systems containing two or more absorbers. Others absorb in the visible range when activated but are more useful as synergistic compounds to extend the range or improve the efficiency of other compounds. The synergic additives may function as single or double energy transfer agents.

For fast-acting photochromic effects by triplet-triplet (T'–T) absorption, the energy-absorbing electron system in the triplet configuration results from absorption of energy by a singlet configuration at a shorter activating wavelength, then intersystem crossing to a triplet configuration followed by energy absorption at longer wavelength. Often, the intersystem crossing efficiency of the molecular structure in which the triplet configuration is desired is low, so that a more effective intersystem crossing from singlet to triplet electronic configuration is achieved by using one molecular structure for achieving the intersystem crossing from singlet to triplet followed by transferring the triplet energy to a molecular structure which has a comparatively long triplet lifetime and effective absorption at the desired wavelength. If the energy is absorbed as singlet energy in molecular structure "D," and converted in D by intersystem crossing to the triplet state, and then transferred to structure "A," wherein the filtered light is absorbed, the process is called single energy transfer. If absorbed by "A" transferred to "D" as singlet energy, crossed in "D" to triplet energy, and then transferred back to "A," the process is called double energy transfer.

The transfer of energy between triplet states was recognized at least as early as 1956 by Terenin and Ermolaev of the Academy of Sciences of U.S.S.R. An English translation of their paper appears in the Transactions of the Faraday Society 52, 1,042–1,051 (1956). Their work was in frozen solutions at about −195° C. The transfer of singlet energy between anthracene and naphthalene structures, separate and linked by saturated chains of one, two and three carbon atoms is disclosed by Schnepp and Levy, J. Am. Chem. Soc. 84 172–177 (1961). Work reported by Lamola, Leermakers, Byers and Hammond J. Am. Chem. Soc. 87 2,322–2,332 (1965) confirms the intramolecular transfer of energy.

Because of the complexity of the chemistry and quantum mechanics involved, a full list of the known compounds or additives which give useful absorption in the visible region, alone or in synergistic combination, would unduly expand this already prolix specification. Additionally, using the criteria herein expressed, other and new compounds can be synthesized.

IN THE DRAWINGS

Figure 1:
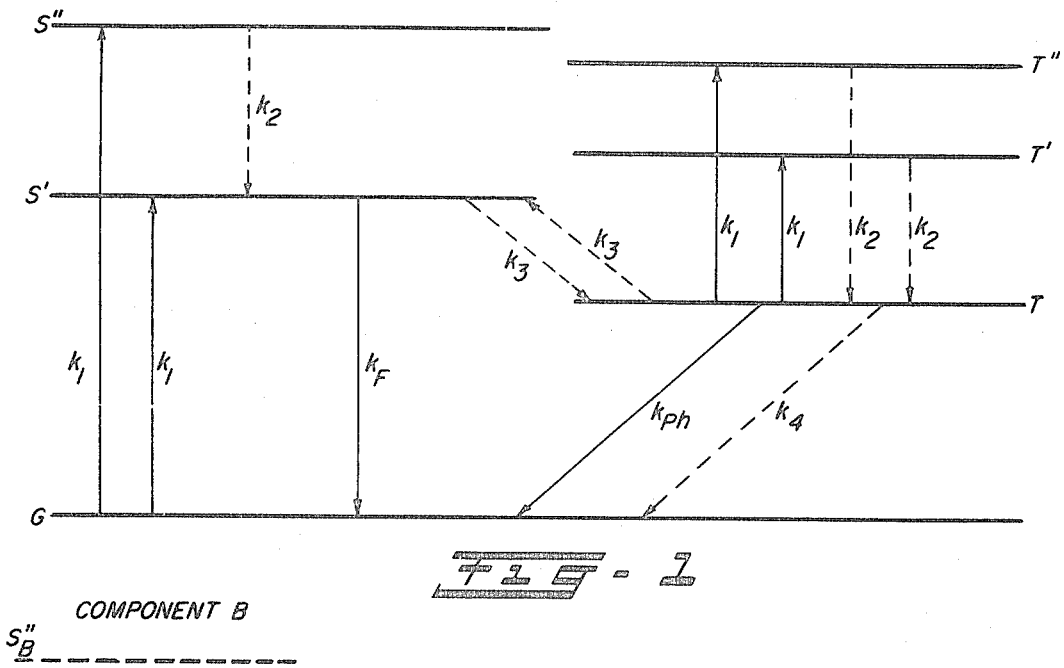
FIG. 1 is a schematic energy level diagram of a system involving a single molecular species.
Figure 2:
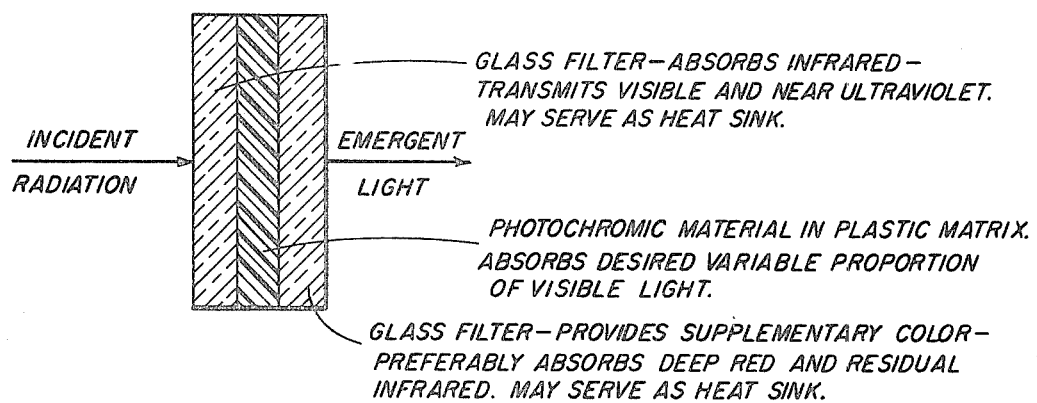
FIG. 2 shows a useful filter system involving the present photochromic materials in a matrix as a filter, in conjunction with other filters.

FIG. 1 is a schematic energy level diagram showing the mechanism by which the metastable light absorption phenomena occur. As proved by quantum mechanics, molecules cannot have just any energy. Instead, only definite values of energy are possible, and these will be characteristically unique for any given molecular species. In FIG. 1, discrete electronic energy levels are depicted by the horizontal lines, and the transitions between energy levels are indicated by vertical or diagonal arrows up for absorption, down for emission. Full arrows are used for transitions which can be observed optically whereas dotted lines indicate radiationless transitions. At room temperature and below essentially all the molecules of the photochromic material (PM) in a sample are distributed among the low-lying rotational and vibrational sublevels (not shown in the diagram) of the lowest (or ground) electronic state (G).

Two series of electronic levels are shown. The series on the left consists of so-called singlet levels, $S'$, $S''$....while that on the right consists of triplet levels, $T$, $T'$, $T''$. According to a spectroscopic rule enunciated by Hund, under "normal" circumstances transitions between levels of unlike multiplicity (singlet and triplet) are not probable and are said to be "forbidden."

Triplet State: A molecule whose electronic configuration is such that it has two unpaired electrons with their spins parallel is said, physically, to be in a triplet state. Chemically, such a molecule would be called a biradical and would be very reactive.

The spectroscopic notations singlet, doublet, triplet, etc., designate the number of separate electronic levels into which the one level will split when the molecule is subjected to the action of an intense magnetic field. A spectroscope can be used to confirm this existence.

$$S = \sum m_s$$

where $m_s$ is the spin quantum number $= +\frac{1}{2}$ or $-\frac{1}{2}$. Multiplicity is No. of sublevels into which the level will split in magnetic field.

Multiplicity $= 2S+1$
$S=0$, $(2S+1) = 1$ singlet state
$S=\frac{1}{2}$, $(2S+1) = 2$ doublet state
$S=1$, $(2S+1) = 3$ triplet state The lowest electronic state in the group of triplets has an energy greater than that of the ground state and is generally a "metastable" state, i.e., one from which optical transitions by emission are improbable (forbidden) so that the lifetime of a molecule in such a state can be much greater than normal. Thus, instead of having mean lifetimes of $10^{-8}$ seconds or less, which would be considered to be "normal" for any state other than the ground state, metastable states have means lifetimes of $10^{-3}$ to about 10 seconds or more. It should be noted that such metastable states can be reached only by an indirect route. Without being limited to the correctness of the scientific basis for the phenomena involved, it is postulated that, in order to achieve photochromism by a mechanism involving such a metastable electronic state, the following sequence of events probably occurs:

a. The substance in the ground state (G) absorbs radiation having sufficient energy to raise the molecules to states which are one of a plurality of possible singlet levels, $S'$, $S''$, or $S'''$ (not shown), or higher.

b. In a condense phase, molecules in states $S''$, $S'''$, or higher, will lose energy by radiationless exchanges and end up on the lowest vibrational level of the singlet state, $S'$. This process is called "interconversion."

c. From state $S'$, molecules can emit light and fall back to the ground state by a process called fluorescence.

d. By the process of "intersystem crossing," singlet molecules can also lose energy by radiationless exchange and end up in the metastable state $T'$. Because of the long lifetime of this state, under certain conditions of illumination, the population of the metastable state can become greater than that of the ground state, even at room temperature.

e. Once in the metastable state, molecules can emit light as phosphorescence (low probability) or give up energy by radiationless transfer (high probability) and end up in the ground state. Two metastable molecules may react with each other to form a ground-state molecule plus an excited singlet molecule ($S'$) which emits so-called "-delayed fluorescence."

f. Molecules in the metastable state can also absorb light and proceed to higher levels of the same multiplicity (in this case, higher triplet levels).

g. Molecules in the higher triplet levels can get back to the lowest triplet state by radiationless transitions (dotted arrows) or by fluorescence (not shown).

Since the triplet states lie closer together than the singlets, the triplet-triplet absorption bands occur at lower energies (longer wavelengths) than the singlet-singlet absorption bands. Thus, if the substance is normally colorless, the singlet bands will occur in the region 2,500–4,000 A. (40,000 to 25,000 cm.$^{-1}$), and the triplet-triplet absorption bands of lowest energy will lie in the visible portion of the spectrum from 4,000 to 6,000 A. (25,000 to 16,666 cm.$^{-1}$) and will extend to still higher energies and overlap the singlet bands in the near U.V. As the primary absorption bands of the substance encroach still further into the violet and blue, the triplet bands of lowest energy will, in turn, lie further in the red and near infrared. Thus, if the photochromic material is placed in an optically transparent matrix which, itself, does not compete with the colorless version of the active material for the exciting light in the near ultraviolet (3,000–4,000 A.), rapid and reversible color development can be made to occur as the population of the metastable state is made to be large or vanishingly small by the presence or absence of optical excitation from radiation in the near ultraviolet.

Since nothing is altered in the active species except the configuration of the electron cloud of the molecule, and since electrons are the lightest particles involved in optical transitions, the mechanism, potentially, and actually, is capable of producing changes in color that would be nearly too fast to measure with apparatus available today. An idea of the speed with which these electronic transitions occur can be obtained from the following table of values for typical velocity constants or frequency factors.

TABLE 4

| Process | Velocity constant | Electronic state | Mean lifetime of state |
|---|---|---|---|
| Absorption | $k_1 \sim 10^{15}$ sec.$^{-1}$ | S' | $\tau_S \sim 10^{-8}$ sec. |
| Interconversion* | $k_2 \sim 10^{13}$ to $10^{14}$ sec.$^{-1}$ | T | $\tau_T \sim 1$ sec. |
| Fluorescence S'–G | $K_F \sim 10^8$ sec.$^{-1}$ | | |
| Intersystem crossing* | $k_3 \sim k_F \sim 10^8$ sec.$^{-1}$ | | |
| Phosphorescence | $k_{Ph} \sim 1$ sec.$^{-1}$ | | |
| Intersystem crossing* T→G | $k_4 \sim 1$ sec.$^{-1}$ | | |

* Radiationless transitions.

The energy significance is shown in FIG. 1. The full lines show quantized radiation absorbed or radiated. The dotted lines show radiationless transitions, in which the energy involved shows up as kinetic energy, that is the thermal motion of the molecules, so that the energy absorbed in the visible spectrum is converted to heat. With intense radiation, the heat dissipation can be the limiting factor.

For molecules containing only carbon and hydrogen atoms, both fluorescence and phosphorescence generally occur, and more often than not, the fluorescence is 10 to 1,000 fold more intense than the phosphorescence. In such molecules, some of the primary energy absorbed is wasted in fluorescence, and the remainder is used in getting molecules into the metastable state. For certain other molecules there is virtually no fluorescence, and the rate constant for intersystem crossing is quite high ($>>10^8$ sec.$^{-1}$), but the mean lifetime of the metastable state is often (but not always) short. Such substances, if they have large T'–T (abbreviation for triplet-triplet transitions, the state with higher energy being written first) extinction coefficients, are excellent for fast applications but poor or useless for steady-state applications since a sizeable population of the metastable state can be achieved only by an intense flash of short duration. The magnitude of the velocity constant for intersystem crossing can be made large if atoms heavier than carbon are introduced into the molecule. Such atoms can be nitrogen, oxygen, sulfur, phosphorus, arsenic, all halogens, and others which are less common. This phenomenon depends on achieving an increase in a factor which is called the "Spin-Orbit Coupling Constant" and which, when it is high, lessens the difference between the singlet and triplet states and renders transitions between such states more probable.

There are certain materials whose photochromism can be explained in terms of the mechanism portrayed in FIG. 1, which work quite well but whose performance can be further improved. For example, dibenz[a,h]anthracene RRI–6383, has very strong T'–T absorption bands in the green and yellow, and a somewhat weaker one in the blue green; there is very little absorption in the red except under intense excitation. Samples also transmit violet and blue light to a small extent. In addition, a portion of the excitation energy taken up by primary absorption in the near ultraviolet is emitted as fluorescence. Whereas this particular absorption characteristic is useful for certain radiation conditions, a broader absorption has other and broader utility. A broader absorption occurs with additives.

While an understanding of the theory of operation is not essential to the practice of this invention, the data seem consistent with the position that for single energy transfer, the absorbing moiety, or D should have its lowest excited singlet level ($S_0$) below that ($S_A$) for the T'–T absorbing molecule, a high intersystem crossing efficiency, and its lowest triplet ($T_0O$) above the lowest triplet ($T_A$) for the T'–T absorbing moiety. For double energy transfer, the lowest excited singlet ($S_A$) for the T'–T absorbing molecule must be above that ($S_0$) for the donor portion, with a high intersystem crossing efficiency for the crossing to the triplet state in the donor portion, and the lowest triplet in the donor ($T_0$) must be above the lowest triplet for the T'–T absorbing ($T_A$) portion, so that the triplet energy can pass downhill to the acceptor in the triplet form. Obviously, the absorption coefficient in the triplet form should be very high for best results. The likelihood of transfer from the acceptor to the donor, and from the donor back to the acceptor for double energy transfer, or from the donor to the acceptor improves with increase in the proximity of the molecules or moieties, which can be increased by changing concentrations, or by positioning the molecules adjacent to each other or linking them.

The photochromic material (PM) is uniformly dispersed throughout the plastic matrix. Among others, the following methods can be used.

a. Dissolve the PM in pure monomer and polymerize the monomer in the absence of oxygen and in such a manner as to achieve practically complete cure leaving essentially no residual monomer.

b. Use method (a) but add 1 to 5 percent of a cross linking agent such as ethylene glycol dimethacrylate before commencing the polymerization.

c. Starting with preformed polymer, dissolve the polymer in a good solvent, precipitate the polymer with a poor solvent in order to remove soluble catalyst fragments, excess monomer, and other soluble impurities; dry the polymer in a vacuum oven, then dissolve a weighed amount of polymer and the proper amount of PM which is to be associated with the polymer in a common solvent. Freeze the solution quickly in dry ice and evaporate the solvent by the freeze-drying technique. Mold the resulting powder so as to produce the desired shape taking suitable precautions to exclude oxygen, to obtain optimum photochromic performance.

d. Dissolve preformed polymer along with the correct amount of PM in a solvent, and then cast thin or thick films on a suitable surface and remove the last traces of solvent by vacuum and mild heating (50°–70° C.).

e. By hot or cold milling (preferably coil) mix the correct amount of PM intimately with preformed polymeric material (preferably purified according to the method described in (c)). Mold the resulting powder so as to produce the shape desired taking precautions to exclude oxygen during molding in order to obtain optimum photochromic performance. The PM may also be finely divided by prior grinding or freeze-drying techniques.

f. Employ the method described in (e) but instead of the PM material itself, use crushed polymer made according to (a) containing a high concentration of PM.

In all cases, (c–f), it is assumed that optical transparency and lack of color of the polymer are both considered to be highly desirable. This being the case, the polymeric materials which exist today and which are useful in this application include:

Table 5

| Thermoplastic | Thermosetting |
| --- | --- |
| Polyacrylates | |
| Polymethacrylates | Unfilled Phenol-Formaldehyde |
| Cellulose Acetate Polymers | Unfilled Melamine-Formaldehyde |
| cellulose Propionate Polymers | Polyester-Styrene Combinations |
| Cellulose Acetate Butyrate Polymers | Polyurethanes |
| | Epoxies |
| Cellulose Nitrate Polymers | |
| | Allyl Carbonates |
| Ethyl Cellulose | |
| Polycarbonates | |
| Polyacrylonitrile (High-Pressure Variety) | |
| Polyamides | |
| Polystyrene | |
| Polymethylstyrenes | |
| Polychloromethylstyrenes | |
| Polystyrene-Butadiene | |
| Polyvinylacetate | |
| Unfilled Polyvinyl Acetals | |
| Polyvinyl Chloride | |
| Polyvinylbutryal | |
| Polyvinylformal | |
| Chlorinated Polyethers | |
| Silicones | |
| and copolymers and mixtures thereof. | |

Although not as commonly used as the transparent plastics, polymers are useful as matrix for the the present photochromic materials if the plastic transmits a particular radiation frequency useful for a special purpose. For example, in sunglasses a plastic with a certain inherent yellowness of color may be advantageous. For use as a photographic filter,[1] as for example with a film sensitive to blue only, the transparency to longer wavelengths is of minor importance. This characteristic is particularly useful in printing negatives of very high contrast, as a sheet of the present PM in a matrix just above the photographic paper reduces contrast, and can thus be used to print contrasty negatives on softer paper. For papers which are sensitive only to blue light, a plastic which inherently absorbs longer wavelengths is perfectly satisfactory as the matrix. In the procedures advocated for preparation specified above, procedures (c) and (d) involve the use of solvents. Appropriate solvents for all possible polymeric systems are well known to those skilled in the art.

The presence of excess or residual monomer in the polymeric matrix is decidedly detrimental to the achievement of photochromism when it is governed by a mechanism involving T'–T absorption. Triplet molecules are also known as biradicals because they possess two unpaired electrons. As such, they are quite reactive and can interact with each other, with oxygen, or with any paramagnetic ion. Consequently, once they are created, they cannot exist for long in a nonviscous liquid medium. A single unpaired electron is responsible for the activity of a free radical, with free radicals responsible for many polymerization mechanisms. A biradical could be properly called a double free radical. Hence, the triplet molecules are extremely reactive, and must be locked in a nonreactive matrix to avoid prompt reaction. Such prompt reaction would prevent the desired photochromism.

Thus, it is necessary to employ a matrix of good optical clarity that is free from: residual monomer, plasticizers; and atoms, molecules, ions or molecular fragments capable of reacting rapidly with triplet molecules or other metastable electronic state molecules, which govern the photochromic effect here disclosed.

One economical method of production of photochromic filters is by employing procedures (a) or (b) of those listed above, with a preferred embodiment being the use of ionizing radiation for inducing polymerization of the vinyl monomer. We find that such a procedure produces a photochromic product capable of developing a greater change in color from a given amount of excitation than can be developed from the same amount of excitation in a sample containing the same monomeric and photochromic starting materials but polymerized by the addition of conventional free-radical catalysts such as benzoyl peroxide or azo-bis-isobutyronitrile. Products which were polymerized in vacuum at room temperature (25°–30° C.) up to the firm gel state by ionizing radiation and then cured in vacuum at 70° C. for 16 hours possessed measured specific triplet-triplet absorption coefficients of 0.5 cm.$^{-1}$ (percent T=31.6 per cm. at 5,400 A.) when excited by near ultraviolet radiation (3,000–4,000 A.) of $1.7\times10^{16}$ quanta/cm.$^2$/sec. ($9.2\times10^4$ ergs/cm.$^2$/sec.) whereas those samples polymerized in vacuum by azo-bis-isobutyronitrile (80 p.p.m.) heated to 40° C. for 3 hours and cured at 80° C. for 16 hours possessed specific triplet-triplet absorption coefficients of 0.1 cm.$^{-1}$ (percent T=79.4 percent per cm. at 5,400 A.) when subjected to the same exciting light. When the samples prepared by the two methods were subjected to flash excitation ($9.1\times10^{17}$ quanta/cm.$^2$/flash, 300–4,000 A.) by a spiral flash lamp containing Xenon (300μf./4,100 v./2,500 Joules), samples 15 mm. long polymerized by ionizing radiation became practically opaque momentarily throughout the entire visible region, with an optical density greater than 3.0 whereas samples polymerized by conventional catalysts, developed only a mild pink color (momentarily). When examined for residual monomer content, the samples polymerized by ionizing radiation were found to contain less than 0.15 percent monomer whereas those polymerized by catalyst contained as much as 10 to 13 percent monomer. By taking appropriate steps to obtain a higher degree of cure with the catalyst, working in a nitrogen atmosphere, the best samples still contained 1.5 percent residual monomer and developed a very useful degree of opacity although not as high a degree of opacity as was obtained with those samples polymerized by ionizing radiation. In addition, since some PM molecules are decomposed at elevated temperatures, these benefits could not be obtained when the samples were polymerized by conventional catalysts because too long a time at too high a temperature is required to obtain adequate cure. (1.5 percent residual monomer). It is, therefore, preferable and a key feature of this invention to use ionizing radiation rather than catalysts for maximum photochromic optical density effect. However, as is quite obvious to those skilled in the art of polymer chemistry, any method that can achieve practically complete cure is satisfactory, as long as it does not also destroy the efficacy of the photochromic materials including additives. For filters where less optical density is required, chemical catalysts give good results.

By using ionizing radiation plus a cure at elevated temperature, it is possible to achieve nearly complete cure and excellent photochromic characteristics. However, by using 2 to 10 percent (preferably 5 percent) of a suitable cross linking agent such as ethylene-glycol-dimethacrylate dissolved in the monomer, less ionizing radiation is required, (0.35 Mrad versus 1.5 Mrad at 0.15 Mrad/hr.) to arrive at the firm gel condition (achieved at room temperature) at which time the cure at elevated temperature (70° C.) is started. Thus, by using a small amount of cross linking agent, the required degree of cure is obtained with only one-fifth the total radiation dose. In addition, and conversely, the presence of the cross linking agent prevents the molding of the photochromic polymer once it is formed. Thus, when moldability is desired the cross linking agent is omitted, using slightly more radiation and a longer curing time. Alternatively, in the absence of cross linking agent, the irradiation can be conducted at a higher dose rate and a somewhat higher temperature, 40°–60° C. instead of 25° C., and/or, after 8–12 hours cure at 80° C., an additional dose of about 0.2 Mrad followed by additional cure at elevated temperature speeds up the process considerably.

In general, a preferred cross linking agent meets the following specifications:

a. It is capable of being purified easily, after which it is colorless.
b. After being incorporated into the plastic medium it does not compete with the PM for the exciting radiation. For example, if the PM absorbs from 3,000 to 4,000 A, the cross linking agent does not absorb radiant energy in this region or in the visible region (4,000–7,500 A.).
c. It does not possess any triplet levels having energies less than that of the lowest triplet of the photochromic material.

In carrying out vinyl-type polymerizations by free radicals generated by the use of ionizing radiation, the type of ionizing radiation used, the range of dose rates, and the range of total doses affect and are controlled to achieve the optimum results. Most filters for preferred usages are not more than 15 millimeters thick; which is the thickness to be penetrated by the ionizing radiation. Thicker layers can be polymerized for special purposes or split into thin layers after polymerization. The densities of the monomers are in the range of 0.80 to 1.05 grams per cubic centimeter; thus, for high-speed electrons, ranges of ~1.5 grams per square centimeter would be required which can be achieved by 3.0 megaelectron volt (Mev.) electrons. However, electrons from existing electron accelerators are not particularly well suited for inducing vinyl-type polymerizations in homogeneous media. The beam of electrons is so concentrated and the dose rate is so great that extremely high local concentrations of free radicals are produced. Since such polymerization reactions are terminated bimolecularly, the overall rate of polymerization is proportional to the square root of the dose rate. Thus, high-dose rates lead to short kinetic chains, low molecular weights, and inefficient utilization of the ionizing radiation. In the case of electrons, this fundamental difficulty can be overcome only if the beam of electrons is attenuated so as to provide a much lower dose rate than those prevailing in the cases of electron accelerators presently commercially available. 250 Kev. peak value X-rays (General Electric Maxitron), and 3 Mev. (constant potential) X-rays (type KS Van de Graaff accelerator with gold X-ray target), are both capable of achieving the necessary penetration in plastic layers up to 15-millimeters thick (the 3 Mev. X-rays can penetrate up to several meters of unit density material before being very markedly attenuated.). Gamma rays such as from radioisotopes, including $Co^{60}$ ($E_\gamma$ =1.17 and 1.31 Mev.) and $Cs^{137}$ ($E_\gamma$=0.6 Mev.), can also be employed instead of X-rays. The range of dose rates can extend from 0.001 megarad per hour (Mrad/hr.) to 40 Mrad/hr. with the total dose ranging from 0.02 Mrad to 10 Mrad. (A dose of 1 rad is defined as the absorption of 100 ergs of energy per gram of sample.) The higher dose rates necessitate cooling of the sample during the polymerization, unless it is of material highly resistant to ionizing radiation, such as styrene.

Using the photochromic materials of Table 1, or Table 2, in a plastic matrix, with or without a synergistic additive, that is an energy transfer moiety, photochromism is induced by: (A) steady-state sources having intensities from at least as low as 1 to at least as great as 10 times sunlight (2–25 calories per square centimeter per minute), and also (B) flash sources. One straight tube-type flash unit delivers 0.001 to 0.025 cal./cm.$^2$/lash with a flash "lifetime" of 50$\mu$sec. (microseconds) and another spiral tube-type delivers 0.07 to 0.80 cal./cm.$^2$/flash with a flash "lifetime" of about 3 msec. (milliseconds). (The flash lifetime is the total time interval during which the intensity of the light from the flash is greater than one-third the peak intensity.)

Results illustrative of each of these flash sources are disclosed in specific examples following. For illustrative purposes, the samples were cylindrical rods 9 mm. in diameter and 5 to 50 mm. long, unless otherwise specified. The intense light used for excitation was essentially perpendicular to the direction of observation of color formation except where otherwise specified. In the steady-state source, excitation and observation occurred simultaneously, whereas with flash excitation, the observation generally followed the flash. When employing the straight flash lamps of 40$\mu$sec. rise time, the intensity of the light transmitted along the axis of the sample was observed in a single, narrow wavelength interval as a function of time. Details of illustrative measurements and the data obtained are given in the following Examples.

The following Examples demonstrate the efficiency with which color can be developed in colorless samples by the action of light. The examples are set forth to illustrate the invention, the scope of which is defined in the claims. The scope of the invention is more widely described in the foregoing discussion, and elsewhere.

The data in Examples 1 to 77 were obtained using specimens in which the active material (one single species in each example) was incorporated by dissolving such single active compound in the proper amount of vinyl monomer, polymerizing the monomer, and subsequently curing the resulting polymer by method 1. Other later examples illustrate methods 2 and 3.

METHOD 1

A solution of the photochromic material sufficient for the specified concentration in 9.5 ml. of inhibitor-free methylmethacrylate plus 0.5 ml. of inhibitor-free ethylene glycol dimethacrylate (unless ratio is otherwise specified) was poured into a glass tube 20 cm. long with an inside diameter of 9.5 mm. The tube was attached to a vacuum line. The solution was outgassed with three freeze-thaw cycles and then the tube was flame-sealed off. It was immediately irradiated with 250 Kevp (kilo-electron volts peak) X-rays at 0.15 Mrad/hr. (Megarads per hour) to a total dose of 0.35 Mrad. The irradiated sample was then heated to 80° C. for 18 hours. The tube was cracked open and a 15 mm. length cut from the resulting plastic rod. The faces of this 15 mm. sample were polished prior to making spectroscopical measurements on this segment.

METHOD 2

A solution containing the photochromic material sufficient for the specified concentration plus 0.0008 g. azo-bis-isobutyronitrile in 9.5 ml. inhibitor-free methylmethacrylate plus 0.5 ml. of inhibitor-free ethylene glycol dimethacrylate was placed in a glass tube with an inside diameter of 9.5 mm. The tube was attached to a vacuum line and the solution outgassed by three freeze-thaw cycles. The tube was then flame-sealed while under vacuum (to close the tube and protect the monomer from oxygen) and heated to 60° C. for 18 hours followed by heating at 100° C. for 24 hours. After standing at ambient temperature for several days the glass tube was broken and a 5 mm. length of the resulting plastic rod cut. The faces of this sample were polished prior to spectroscopical measurements.

METHOD 3

A quantity of pure photochromic material sufficient for the specified concentration was dissolved in 47.5 ml. of inhibitor-free methylmethacrylate plus 2.5 ml. of inhibitor-free ethylene glycol dimethacrylate. The solution was transferred to a glass cylinder 80 mm. in diameter and 50 mm. high through a 5 mm. diameter and 30 mm. long side arm near the top of the cylinder. Dry nitrogen was bubbled through the solution for 1 hour. The side arm was then flame-sealed (closed) in a stream of dry nitrogen to prevent oxygen from reaching the solution. The solution was irradiated with 250 Kevp X-rays at a dose rate of 0.1 Mrad/hr. to a total dose of 0.35 Mrad. The sealed cylinder was subsequently heated at 80° C. for 18 hours and then opened. After the faces of the resulting transparent plate were polished, spectra were observed.

Representative results are shown in the following Examples:

| Example Number | Photochromic material | Conc., mol/liter | Matrix | Length in cm. | Exciting source | Results |
|---|---|---|---|---|---|---|
| 1 | 1,10-phenanthroline, RRI-3480. | 5×10⁻³ | 90% PMMA, 10% EgdM. |  | Xe Flash 1 | Absorbs moderately below 4,550 A. |
| 2 | 1,7-phenanthroline, RRI-3478. | 5×10⁻³ | 95% PMMA, 5% EgdM. | 1.5 | do | Moderate abs. below ~5,400 A. Weakly and ~4,700 A., O.D.=1.9 at 4,700 A. |
| 3 | Anthracene, RRI-3618 | 5×10⁻⁴ | 95% PMMA, 5% EgdM. | 5.3 | Hg. St. state | Sharp abs. max. 4,407 A. (O.D.=.27). |
| 4 | Phenanthrene, RRI-3619 | 5×10⁻⁴ | 95% PMMA, 5% EgdM. | 1.5 | Xe Flash 1 | Abs. max. 4,870, 4,545, 4,254 A. |
| 5 | Thebenidine (1-azapyrene), RRI-5178. | 5×10⁻⁴ | 95% PMMA, 5% EgdM. | 1.5 | Xe Flash 2 | Absorbs below 4,900 A. |
| 6 | Thebenidine (1-azapyrene), RRI-5178. | 5×10⁻⁴ | 95% PMMA, 5% EgdM. | 0.5 | do | Band max. 4,051 (O.D.=0.74). |
| 7 | Pyrene, RRI-5262 | 5×10⁻⁴ | 95% PMMA, 5% EgdM. | 1.5 | Xe Flash 1 | Absorption max. 5,190 and 4,870 A. Opaque below 4,200 A. |
| 8 | Benzo[kl]xanthene, RRI-5230. | 5×10⁻⁴ | 95% PMMA, 5% EgdM. | 1.5 | do | Absorbs below 5,200 A. |
| 9 | Benzo[kl]xanthene, RRI-5230. | 5×10⁻⁴ | 95% PMMA, 5% EgdM. | 1.5 | Xe Flash 2 | Band max. 4,674 (O.D.<0.76). |
| 10 | Benzo[b]naphtho[1,2-d]thiophene, RRI-4684. | 3.4×10⁻⁴ | 95% PMMA, 5% EgdM. | 1.5 | Xe Flash 1 | Abs. max. 5,034. O.D. rises from 4,700 to O.D.>2.5 at 3,800. |
| 11 | Dibenzo[f,h]quinoxaline, RRI-5010. | 5×10⁻⁴ | 95% PMMA, 5% EgdM. | 1.5 | do | Weak absorption in violet. |
| 12 | 7H-benz[de]anthracen-7-one, I. | 5×10⁻⁴ | 95% PMMA, 5% EgdM. | 1.5 | do | Some absorption below 5,000 A. Band max. 4,963 (O.D. 0.67). |
| 13 | Benz[a]acridine, RRI-5144 | 5×10⁻⁴ | 95% PMMA, 5% EgdM. | 1.5 | do | O.D.>2.6 below 5,200 A, ~5% T 5,200 to 6,500 A. |
| 14 | Benz[a]acridine, RRI-5144 | 5×10⁻⁴ | 95% PMMA, 5% EgdM. | 0.5 | Xe Flash 2 | Band max. 4,922 (O.D. 0.82), 4,728 (O.D. >0.88), 4,404 (O.D. 0.59). |
| 15 | Benz[b]acridine, RRI-5140 | 5×10⁻⁴ | 95% PMMA, 5% EgdM. | 1.5 | Xe Flash 1 | O.D. >2.6 3,000 to 7,000 except ~2 % T 5,000 to 4,700 A. |
| 16 | Benz[b]acridine, RRI-5140 | 5×10⁻⁴ | 95% PMMA, 5% EgdM. | 0.5 | Xe Flash 2 | Band max. 5,890 (O.D. >1.44), 3,744 shoulder (O.D. 0.29). |
| 17 | Benz[c]acridine, RRI-5148 | 5×10⁻⁴ | 95% PMMA, 5% EgdM. | 1.5 | Xe Flash 1 | O.D. >2.6 below 5,200, some absorption to 6,500. |
| 18 | Benz[c]acridine, RRI-5148 | 5×10⁻⁴ | 95% PMMA, 5% EgdM. | 0.5 | Xe Flash 2 | Band max. 4,937 (O.D. 1.3), 4,698 (O.D. 1.05), 4,407 (O.D. 0.84). |
| 19 | Benz[b]acridin-12(5H)-one, II. | 5×10⁻⁴ | 95% PMMA, 5% EgdM. | 1.5 | Xe Flash 1 | Absorbs (O.D. >2.6) 7,000-3,000 except ~2% T 5,000-4,700 A. |
| 20 | Benz[b]acridin-12(5H)-one, II. | 5×10⁻⁴ | 95% PMMA, 5% EgdM. | 0.5 | Xe Flash 2 | Band max. 5,897 (O.D. 2.8). |
| 21 | Benzo[ghi]fluoranthene, RRI-6092. | 5×10⁻⁴ | 95% PMMA, 5% EgdM. | 1.5 | Xe Flash 1 | Absorbs (O.D. >2.6) below 4,400 A. Some absorption to 6,200. |
| 22 | Benz[a]anthracene, RRI-5253. | 2.5×10⁻⁴ | 95% PMMA, 5% EgdM. | 5.8 | do | Essentially opaque below 5030 A. Weak bands, max. at 5,876 and ~6,500 A. |
| 23 | Chrysene, RRI-5254 | 5×10⁻⁴ | 95% PMMA, 5% EgdM. | 3.8 | do | O.D. 2.6 below 4,130 A and from 4,700 to 6,020 A. >5% Transmission from 4,140 to 4,700 A. Increasing transmission 6,040 to 6,600 A. |
| 24 | Benzo[b]naphtho(2,3-f)-[1,4]diazocine, R.I.S. 9111. | 5×10⁻⁴ | 95% PMMA, 5% EgdM. | 1.5 | do | Band Max. ~4,350. |
| 25 | 2-Aminochrysene, III | 5×10⁻⁴ | 95% PMMA, 5% EgdM. | 1.5 | do | Unstable. Transmits above 5,800 A. and between 5,000 and 4,400. |
| 26 | Benz[e]acephenanthrylene, RRI-6070. | 5×10⁻⁴ | 95% PMMA, 5% EgdM. | 1.5 | do | O.D. >2.6 below 4,700 A. |
| 27 | Benzo[a]pyrene, RRI-6399 | 5×10⁻⁴ | 90% PMMA, 10% EgdM. |  | Hg St. state | Weak abs. max. 5,029, 4,475. |
| 28 | Benzo[e]pyrene, RRI-6400 | 1.3×10⁻³ | 95% PMMA, 5% EgdM. | 1.5 | Xe Flash 1 | Abs. max. 5,526 A (O.D. >.84). |
| 29 | Dibenzo[a,c]phenazine, RRI-6221. | 5×10⁻⁴ | 95% PMMA, 5% EgdM. | 6.5 | do | O.D. >2.6 below 6,600 A.-very slight transmission above 5,900 A. |
| 30 | Dibenzo[a,h]phenazine, RRI-6223. | 5×10⁻⁴ | 95% PMMA, 5% EgdM. | 1.5 | do | O.D. >2.6 from ~5,640 to 4,670 A. and below 4,300 A., very slight transmission 4,670 to 4,300 A.; transmits slightly (T ~2%) above 5,800 A. |
| 31 | Dibenzo[a,h]phenazine, RRI-6223. | 5×10⁻⁴ | 95% PMMA, 5% EgdM. | 1.5 | 4,200 v./150 μf. air flash. | O.D. 1.3 at 5,400 A. Special Expt. Excitation by $5.57 \times 10^{16}$ quanta/cm.² (2,000-5,000 A.). Total energy incident on sample: 0.011 cal./cm.² (2,000 A. to 3.3μ). Total energy incident on sample to produce O.D. 3.0: 0.025 cal./cm.² (2,000 A. to 3.3μ). |
| 32 | Dibenzo[a,h]phenazine, RRI-6223. | 5×10⁻⁴ | 95% PMMA, 5% EgdM. | 0.5 | Xe Flash 2 | Band max. 5,177 A. (O.D. 1.99). |
| 33 | Dibenzo[a,j]phenazine, RRI-6222. | 7×10⁻⁵ | 95% PMMA, 5% EgdM. | 1.5 | Xe Flash 1 | Broad absorption band centered around 5,177 A. (O.D.=.53). |
| 34 | Dinaphtho[2,1-b:1′,2′-d]furan, RRI-5945. | 5×10⁻⁴ | 95% PMMA, 5% EgdM. | 1.5 | do | Band 5,800 A. |
| 35 | Dinaphtho[1,2-b:1′,2′-e]-p-dioxin, RRI-6246. | 5×10⁻⁴ | 95% PMMA, 5% EgdM. | 1.5 | do | Moderate absorption throughout visible. |
| 36 | 7H-dibenzo[c,g]-carbazole, RRI-5900. | 5×10⁻⁴ | 95% PMMA, 5% EgdM. | 1.5 | do | Unstable, absorbs (O.D.>2.6) 6,600 to 5,700, fair absorption below 4,400. |
| 37 | 7H-dibenzo[c,h]-phenothiazine, RRI-6170. | 5×10⁻⁴ | 95% PMMA, 5% EgdM. | 1.5 | do | Unstable band ~4,800 A. |
| 38 | Benzo[a]pyrido[1′2′:1,2]-imidazo[4,5-c]phenazine, IV. | 5×10⁻⁴ | 95% PMMA, 5% EgdM. | 1.5 | do | O.D.>2.6 3,000-7,000 A. |
| 39 | Benzo[a]pyrido[1′2′:-1,2]imidazo[4,5-c]-phenazine, IV. | 5×10⁻⁴ | 95% PMMA, 5% EgdM. | 0.5 | Xe Flash 2 | Band max. 5694 (O.D. 1.46), 5,249 (O.D. 1.37). |
| 40 | Dibenz[a,h]acridine, RRI-6298. | 5×10⁻⁴ | 95% PMMA, 5% EgdM. | 1.5 | Xe Flash 1 | O.D.>2.6 7,000-3,000 A. |
| 41 | Dibenz[a,h]acridine, RRI-6298. | 5×10⁻⁴ | 95% PMMA, 5% EgdM. | 0.5 | Xe Flash 2 | Band max. 5,418 A. (O.D. >2.5). |
| 42 | Dibenz[a,j]acridine, RRI-6296. | 5×10⁻⁴ | 95% PMMA, 5% EgdM. | 1.5 | Xe Flash 1 | O.D. >2.6 5,870-4,700 and below 4,200. |
| 43 | Dibenz[a,j]acridine, RRI-6296. | 5×10⁻⁴ | 95% PMMA, 5% EgdM. | 0.5 | Xe Flash 2 | Band max. 5,267 (O.D. >1.55). |
| 44 | Benzo[ghi]perylene, RRI-7036. | 5×10⁻⁴ | 95% PMMA, 5% EgdM. | 1.5 | Xe Flash 1 | O.D. >2.6 below 5,800 A., fair 5,800 to 6,500. |

| Example Number | Photochromic material | Conc., mol/liter | Matrix | Length in cm. | Exciting source | Results |
|---|---|---|---|---|---|---|
| 45 | Benzo[ghi]perylene, RRI-6036. | 5×10⁻⁴ | 95% PMMA, 5% EgdM. | 0.5 | Xe Flash 2 | Band max. 5,675 (O.D. >0.59), 5,284 (O.D. >0.95), 4,657 (O.D. >3.4). |
| 46 | Indeno[1,2,3-cd]pyrene, R.I.S. 9508. | 5×10⁻⁴ | 95% PMMA, 5% EgdM. | 1.5 | Xe Flash 1 | O.D. >2.6 below 5,000 A. |
| 47 | Indeno[1,2,3-cd]pyrene, R.I.S. 9508. | 5×10⁻⁴ | 95% PMMA, 5% EgdM. | 0.5 | Xe Flash 2 | Band max. 4,858 (O.D. 0.46). |
| 48 | Benzo[b]chrysene, RRI-6379. | 5×10⁻⁴ | 95% PMMA, 5% EgdM. | 1.5 | Xe Flash 1 | O.D. >2.6 below 6000A except ~1% T from 5,000 to 4,500A. |
| 49 | Benzo[b]chrysene, RRI-6379. | 5×10⁻⁴ | 95% PMMA, 5% EgdM. | 1.5 | 4,200 v./150 μF. air flash. | O.D.=0.6 at 5,400 A. Special expt. Excitation by 5.57×10¹⁶ quanta/cm.² (2,000–5,000 A.). Total energy incident on sample: 0.011 cal/cm.² (2,000 A. to 3.3 μ). Total energy incident on sample to produce O.D. 3.0: 0.025 cal/cm.² (2,000 A. to 3.3 μ). |
| 50 | Dibenz[a,c]anthracene, RRI-6381. | 5×10⁻⁴ | 95% PMMA, 5% EgdM. | 6.0 | Xe Flash 1 | O.D. >2.0 below 4,700 A. and from 5,600 to 6,250 A. ~5% T from 4,750–5,600 A. and above 6,250 A. |
| 51 | Dibenz[a,h]anthracene, RRI-6383. | 5×10⁻⁴ | 90% PMMA, 10% EgdM. | 4.3 | ...do... | O.D. >2.6 below 7,000 A. Absorption for λ >7,000 A. not measured. (4,100 V./450 μf.≡ 3,785 joules, 1.37×10¹⁸ q./cm.² from 3,000–4,000 A. incident). |
| 52 | Dibenz[a,h]anthracene, RRI-6383. | 5×10⁻⁴ | 98% PMMA, 2% EgdM. | 2.65 | Hg St. State | Abs. band max. 5,725 A. (O.D.=1.9), 5,400 A. (O.D.=1.05), 5,000 A. (O.D.=0.68). |
| 53 | Dibenz[a,h]anthracene, RRI-6383. | 5×10⁻⁴ | 95% PMMA, 5% EgdM. | 1.5 | Xe Flash 1 | O.D. >2.6 below ~4,000 A. and from 4,500 to 6,000 A., ~0.5% T 4,000 to 4,500 A; ~25% T above 6,300 A. |
| 54 | Dibenz[a,h]anthracene, RRI-6383. | 5×10⁻⁴ | 95% PMMA, 5% EgdM. | 1.5 | 4,200 v./150 μf. air flash. | O.D.=0.8 at 5,400 A. Special expt. excitation by 5.57×10¹⁶ quanta/cm.² (2,000–5,000 A.). Total energy incident on sample: 0.011 cal/cm.² (2,000 A. to 3.3 μ). Total energy incident on sample to produce O.D. 3.0: 0.025 cal/cm.² (2,000 A. to 3.3 μ). |
| 55 | Picene RRI-6384 | 5.3×10⁻⁴M | 95% PMMA, 5% EgdM. | 1.5 | Xe Flash 1 | Abs. max. 6,164 A. (O.D.>2.5). |
| 56 | Dibenzo[c,g]phenanthrene, RRI-6387. | 5×10⁻⁴ | 95% PMMA, 5% EgdM. | 1.5 | ...do... | Abs. bands 5,281 (weak), 4,627 (strong). |
| 57 | 10-methylbenzo[g]chrysene, V. | 5×10⁻⁴ | 95% PMMA, 5% EgdM. | 1.5 | ...do... | O.D. >2.6 from 5,200 to 4,530 and below 3,900 A. Transmits ~ 5%, 4,000 to 4,500 A. |
| 58 | 10-Methylbenzo[g]chrysene-1,3,5-trinitrobenzene complex, VI. | 2×10⁻⁴ | 95% PMMA, 5% EgdM. | 1.5 | ...do... | Weak abs. band max. 4,836. |
| 59 | Coronene, RRI-7392 | <5×10⁻³ | 90% PMMA, 10% EgdM. | 5.3 | Hg St. State | Abs. max. 6,300 (O.D.=.95), 5,146 (O.D.=.97). |
| 60 | Coronene, RRI-7392 | 5×10⁻⁴ | 95% PMMA, 5% EgdM. | 1.5 | Xe Flash 1 | O.D. >2.6 below 5,015 A. Abs. max. at 6,300, 5,839, 5,458 A., ~2% T between bands. |
| 61 | Dibenzo[def,p]chrysene, RRI-7030. | 5×10⁻⁴ | 95% PMMA, 5% EgdM. | 1.5 | ...do... | O.D. >2.6 below 5,200 A., ~2% T 5,200 to 6,200. |
| 62 | Naphtho[1,2,3,4-def]chrysene, RRI-7026. | 5×10⁻⁴ | 95% PMMA, 5% EgdM. | 1.5 | ...do... | O.D. >2.6 3,000 to 7,000 A. |
| 63 | Naphtho[1,2,3,4-def]chrysene, RRI-7026. | 5×10⁻⁴ | 95% PMMA, 5% EgdM. | 0.5 | Xe Flash 2 | Band max. 6,053 (O.D. 1.75), 5,585 (O.D. 1.3), 5,162 (O.D. .97), 4,331 (O.D. 0.95), 4,092 (O.D. 0.53). |
| 64 | Dibenzo[fg,op]-naphthacene, RRI-7022. | 5×10⁻⁴ | 95% PMMA, 5% EgdM. | 1.5 | Xe Flash 1 | O.D. >2.6 5,900 to 5,200 and below 4,100, ~5% T 4,100 to 5,200. |
| 65 | Dibenzo[fg,op]-naphthacene, RRI-7022. | 5×10⁻⁴ | 95% PMMA, 5% EgdM. | 0.5 | Xe Flash 2 | Band max. 5,722 (O.D. >0.91). |
| 66 | Dibenzo[b,def]-chrysene, RRI-7028. | 5×10⁻⁴ | 95% PMMA, 5% EgdM. | 1.5 | Xe Flash 1 | Band max. ~5,800, 5,100. |
| 67 | Benzo[rst]pentaphene, RRI-7029. | 5×10⁻⁴ | 95% PMMA, 5% EgdM. | 1.5 | ...do... | Band max. >6,500, ~5,950; O.D. >2.6 below 5,100. |
| 68 | Benzo[rst]pentaphene, RRI-7029. | 5×10⁻⁴ | 95% PMMA, 5% EgdM. | 0.5 | Xe Flash 2 | Band Max. 4,860 (O.D. 1.3), 4,514 (O.D. 0.73). |
| 69 | Tribenzo[a,c,i]-phenazine, RRI-6915. | 6×10⁻⁵ | 95% PMMA, 5% EgdM. | 1.5 | Xe Flash 1 | Broad abs. max. 5,228 (O.D.=1.04). Medium overall abs. above 4,200 A.; O.D. rises from 4,600 A. to O.D.>2.6 at 4,200 A. |
| 70 | 2,3-diphenylbenzo[f]-quinoxaline, VII. | 5×10⁻⁴ | 95% PMMA, 5% EgdM. | 1.5 | ...do... | Moderate absorption, band at 5,442 (O.D. 1.06), 4,241 (O.D. 0.35). |
| 71 | Dibenzo[b,k]chrysene, RRI-7002. | 5×10⁻⁴ | 95% PMMA, 5% EgdM. | 1.5 | ...do... | O.D. >2.6 above 6,000 A., slight absorption 6,000 to 4,000. Band max. 5,075 (O.D. 0.58). |
| 72 | Dibenzo[g,p]chrysene, RRI-7010. | 6×10⁻⁵ | 95% PMMA, 5% EgdM. | 1.5 | ...do... | Abs. maxima 4,249 (O.D.=.98), 4,489. (O.D.=1.43). |
| 73 | Benzo[a]coronene, R.I.S. 9650. | 2.5×10⁻⁴ | 95% PMMA, 5% EgdM. | 1.5 | ...do... | O.D. >2.6 3,000 to 6,400 A. |
| 74 | Benzo[a]coronene, R.I.S. 9650. | 2.5×10⁻⁴ | 95% PMMA, 5% EgdM. | 0.5 | Xe Flash 2. | Band max. 5,087 (O.D. >2.0), 4,158 (O.D. 1.75). |
| 75 | Dibenzo[h,rst]-pentaphene, RRI-7381. | 2.5×10⁻⁴ | 95% PMMA, 5% EgdM. | 1.5 | Xe Flash 1. | O.D. >2.6 3,000 to 7,000 A. |
| 76 | Dibenzo[h,rst]-pentaphene, RRI-7381. | 2.5×10⁻⁴ | 95% PMMA, 5% EgdM. | 0.5 | Xe Flash 2. | Band max. >6,000, 5,186 (O.D. 0.83), 4,886 (O.D. 0.39), 4,321 (O.D. 0.79). |
| 77 | Benzo[g]chrysene picrate, VIII. | 1×10⁻⁴ | 95% PMMA, 5% EgdM. | 1.5 | Xe Flash 1. | Abs. band max. 5,015 A. (weak). |

NOTE 1.—All samples were cylindrical rods ~9 mm. in diameter having lengths of 1.5 to 6.5 cm. with the end faces ground flat and polished. Excitation was perpendicular to axis, observation was parallel thereto.

NOTE 2.—Excitation was achieved by three different sources:
(a) Steady-state excitation by two 250 watt glass Hg arcs with NiO filters between arcs and sample to remove light of λ >4,000 A. The energy incident on the samples was 9.2×10⁴ ergs/cm.² sec. (1.71×10¹⁶ quanta/cm.² sec. from 3,000 to 4,000 A. 73% of which was λ 3,650 A.)
(b) Xenon Spiral Flash Lamp (quartz) which had 6 mm. of Pyrex between lamp and samples. Two different flashes were used; Xe Flash 1 involved 300 μf. at 4,100 v. with electrical input of 2,500 joules which yielded 6.21×10⁵ ergs/cm.² incident on the sample (9.10×10¹⁷ quanta/cm.², 3,000 to 4,000 A.) ⅔ of which energy was delivered in 0.003 sec. For Xe Flash 2 (75 μf./3,000 v.), the corresponding figures were 334 J, 8.3×10⁵ ergs/cm.², 1.22×10¹⁷ quanta/cm.² (3,000–4,000 A.), and 0.0015 sec., respectively.
(c) Two straight, large-bore, quartz flash lamps were mounted horizontally with the sample positioned in between them. Using an electrical input of 150 μf. at 4,200 v. (1,323 joules) to the two lamps in series provided 5.57×10¹⁶ quanta/cm.² (2,000 to 5,000 A.) incident on the sample measured by actinometry.
When this measured value is converted to one encompassing all wavelengths (2,000 A. to 3.3μ) the total amount of radiation hitting the sample was 4.6×10⁵ ergs/cm.² or 0.011 cal./cm.². Two-thirds of this energy was delivered in 50 μsec., and the time for the flash to reach peak intensity was 40 μsec.

NOTE 3.—The analyzing beam consisted of continuous light from an overloaded tungsten filament bulb (Westinghouse type BSW, 20AT5/SCP, 7 volts but run at 10 volts). An enlarged image of this filament was focussed on the sample and a somewhat reduced image of the center of the sample was focussed on the slit of a fast grating spectrograph. Normally, a neutral filter having a known transmittance of ~0.4 was used in front of the slit to weaken the beam when photographing the spectrum of the light transmitted by the beam before excitation. This was removed when taking the spectrum of the sample during steady-state excitation or after excitation by the spiral flash.

NOTE 4.—In Examples 31, 49 and 54 which utilized the straight flash lamps mentioned in Note 2(c), a Sylvania 100 watt Zr arc was employed as the analyzing source. The light transmitted axially by the sample was focussed onto the slit of a photoelectric, prism spectrometer, and the output of the detector (Du Mont photomulitplier type 6292) was applied (cathode follower circuit) to the vertical sweep of a cathode-ray oscilloscope. Thus, the vertical scale was calibrated linearly in transmittance at a specific wavelength (5,400 A.), and the horizontal scale gave units of time (generally 20 μsec./cm.). This permitted the transmission to be followed continuously as a function of time during the flash and immediately thereafter.

NOTE 5.—PMMA is polymethyl methacrylate, EgdM is ethylene glycol dimethacrylate.

Example 78

A rod containing $5.0\times10^{-4}$M dibenz[a,h]anthracene (RRI-6383) and no cross linking agent was prepared by Method 1 modified by irradiating for 7 hours at a dose rate of 0.15 Mrad/hr. (total dose = 1.05 Mrad). After the X-irradiation was completed, the rod was cured in vacuum for 17 days at 80° C. Using a spectroscopic method involving an absorption band or methyl methacrylate monomer in the near infrared (1.635 $\mu$), the residual monomer content was analyzed to be less than 0.2 percent. When a 1.5 cm. length of this sample was examined for T'–T absorption using flash excitation it was determined that the degree of color development achieved exceeded slightly that exhibited by an excellent sample containing 5 percent ethylene glycol dimethacrylate cross linking agent also prepared by method 1 but cured only 16 hours. Thus, a cross linking agent is not necessary to achieve strong color development, but, the presence of the cross linking agent can diminish the time required for achieving the degree of cure necessary to prevent residual monomer, etc., from interacting with molecules of the photochromic material in the metastable state.

Example 79

The uncross linked rod described in Example 78 was examined along with three other rods, each of which had 5 percent ethylene glycol dimethacrylate prepared by Method 1 and containing: Benz[b]acridine (RRI-5140), Benzo[rst]pentaphene (RRI-7029), and Dibenzo[a,j]phenazine (RRI-6222). Lengths of these rods 0.5 cm×0.9 cm. in diameter were subjected to excitation in a spiral flash unit using 75 $\mu$f./3,000 v. which supplied energy of $8.31\times10^5$ ergs/cm.$^2$ ($1.22\times10$ quanta/cm.$^2$, 3,000–4,000 A.) incident on the samples. The duration of the flash was about 0.0015 sec., and about 0.03 sec. after the flash, an electrically operated shutter in front of the slit of the spectrograph was opened to take the absorption spectrum of the material in the rod. The exposure time was 0.04 sec. Under the conditions prevailing, the absorption spectrum of each rod contained one or more fairly sharp absorption bands in the violet or near UV which are attributable to molecules in the ground state. These were visible both before the flash and immediately after the flash. The changes in the intensities of these bands were employed to evaluate the depletion of the populations of the ground states of the photochromic materials in the various rods. Then, by evaluating the optical densities of the various T'–T absorption bands and assuming that the molecules missing from the

TABLE 6

| Photochromic material | Conc., mol/liter | Singlet $\lambda$(A.) | $c_T$(m./l.) | $\lambda$(A.) | $\epsilon_{T'T}$ |
|---|---|---|---|---|---|
| Dibenz[a,h]anthracene RRI-6383 | $5\times10^{-4}$ | 3,940 | $3.0\times10^{-4}$ | (5,723) (5,389) | $1.25\times10^4$ $1.05\times10^4$ |
| Dibenzo[a,j]phenazine RRI-6222 | $6.9\times10^{-5}$ | 4,160 | $6.2\times10^{-5}$ | (5,015) [1] (5,177) | $6.5\times10^3$ $5.6\times10^3$ |
| Benz[b]acridine RRI-5140 | $5.0\times10^{-4}$ | 4,353 | $3.99\times10^{-4}$ | (5,890) [2] (3,744) | $>7.2\times10^3$ $3.5\times10^3$ |
| Benzo[rst]pentaphene RRI-7029 | $5\times10^{-4}$ | 4,324 | $2.47\times10^{-4}$ | (4,868) (4,514) | $1\times10^4$ $6\times10^3$ |

[1] Very broad.
[2] Shoulder.

NOTE.—Samples 9 mm. diameter by 5 mm. long. Flash excitation by $1.22\times10^{17}$ quanta/cm.$^2$ (3,000–4,000 A.) delivered to sample ~1.5 msec.

ground state were in the lowest triplet state, the excitation coefficients for the T'–T bands could be calculated since the lengths of samples and concentrations of triplet molecules were now known. The data appear in Table Thus, assuming $\epsilon T'T=1\times10^{-4}$ L/M· cm, the product of $L\times c_T$ would be $3\times10^{-4}$ cm·M/L if the optical density were to be 3.0 (Transmittance =0.001). For L values of 0.5, 0.1, 0.05, and 0.02 cm., the corresponding values of $c_T$ are $6\times10^{116}$ $^4$, $3\times10^{-6}\times10^{-3}$ and $1.5\times10^{-2}$ M/L. Assuming that the incident light is strong enough to produce 20 percent depletion of the ground state, the initial concentrations of active material would have to be $3\times10^{-3}$, $1.5\times10^{-2}$, $3\times10^{-2}$ M/L, and $7.5\times10^{-2}$ M/L, respectively. Thus, changes of optical density as great as 3.0 at wavelengths near the peak of the visibility curve of the eye are achieved using layers as thin as 0.1 cm. if very short (1 to 50 $\mu$sec.) flashes are used of sufficient intensity to drive as little as 20 percent of the molecules into the metastable state since concentration levels as high as $1.5\times10^{-2}$ M/L of these molecules can be used in plastic matrices. The thickness and optical density is a matter of choice, depending upon the purpose of the filter.

EXAMPLE 80

Four samples in the form of rods were made up by Method 1 and were cut to lengths of 1.5 cm. with the end faces ground and polished. These were examined individually by the use of apparatus capable of recording the intensity of light transmitted by the sample at specific wavelength (or wavelength interval) as a function of time. (See note 5 to Examples 1 to 77). The data are summarized in Table 7.

The data in the last column of Table 7 show that the change in optical density produced by the action of the incident light varies linearly with intensity under the range of experimental parameters here illustrated. For the PM Dibenzo[a,h]phenazine (RRI-6223) that works the fastest and also develops the greatest amount of color, the oscilloscope traces show that 80 percent of the maximum amount of color produced by the action of the 4,200 v. flash is achieved by the time the flash

TABLE 7

Optical densities achieved by T'T absorption using two different intensities of excitation having an intensity ratio of 1.0 to 3.3 incident on sample. (Spectrometer set at 5,400 A. Lamps discharged at 150 $\mu$F./3,000 v. and 150 $\mu$F./4,200 v.)

| Sample | Voltage | Min. percent transmission (after 120 $\mu$sec.) | Time to ½ minimum transmission $\mu$sec. | Maximum optical density | Ratio of optical densities 4,200 v./ 3,000 v. |
|---|---|---|---|---|---|
| Dibenzo[a,h]phenazine $5\times10^{-4}$ M (RRI-6223) | 4,200 | 6 | 24 | 1.2 | |
|  | 4,200 | 5 | 23 | 1.3 | 3.02 |
|  | 3,000 | 37 | 23 | 0.43 | |
| Dibenz[a,h]anthracene $5\times10^{-4}$ M (RRI-6383) | 4,200 | 16 | 30 | 0.80 | 3.37 |
|  | 3,000 | 58 | 29 | 0.24 | |
| Dibenz[a,h]anthracene plus thianthrene (RRI-3149) (each $5\times10^{-4}$ M). | 4,200 | 16 | 31 | 0.80 | 3.06 |
|  | 3,000 | 55 | 33 | 0.26 | |
| Benzo[b]chrysene $5\times10^{-4}$ M (RRI-6379) | 4,200 | 24 | 31 | 0.62 | 3.30 |
|  | 3,000 | 65 | 25 | 0.19 | |

NOTES.—1. The values for the intensities were measured by means of a potassium ferrioxalate actinometer solution. 2. The intensity of the light transmitted by the sample as a function of time was corrected for light emitted and scattered by the sample. 3. The flash reaches its maximum intensity in 40 $\mu$sec. and has a total width of about 50 $\mu$sec. except for a weak shoulder that extends the total duration of the flash to about 110 $\mu$sec.

reaches peak intensity. Then, 15 to 20 μsec. after the flash peaks, the sample has developed the maximum color.

Assuming $\epsilon_{T'-T}$Max. to be ~$1.6 \times 10^4$ L/M. cm. and to lie at ~5400 A., then, since the optical density measured is 1.3, $1.3 = \epsilon_{T'T} \cdot c_T \cdot L$, which, for L=1.5 cm. yields the value $c_T$=5.4 $\times 10^{-5}$M. This means that the ground-state depletion produced by the flash (~$1 \times 10^{16}$ quanta/cm$^2$ from 3,000–4,000 A.) was only 10.8 percent. Thus, to get an optical density of 3.0 would require only a 25 percent depletion in a 1.5 cm. length of sample having $c_o$=5×10$^{-4}$M.

For the flash at 150 μf./4,200 v. as determined by actinometry, there were 5.57×10$^{16}$ quanta/cm.$^2$ incident on the sample during the flash in the interval 50,000 to 20,000 cm.$^{-1}$ (2,000 to 5,000 A.). Extrapolated to 3,000 cm.$^{-1}$ (3.3 μ), there were ~4.6×10$^5$ ergs/cm.$^2$ or 0.011 cal./cm$^2$ incident on the sample (2,000 A. to 30,000 A.), and near UV incorporated in this total radiation induced enough color to produce an optical density of 1.3.

In order to provide protection against flash blindness from a nuclear explosion, an optical density of 3.0 or greater throughout the region 2,000 A. to 3μ to is preferred. (This would require 0.025 cal./cm.$^2$ incident on the sample from 2,000 A. to 30,000 A.) Thus, assuming that the photochromic material is used to provide this protection on a transitory basis in the visible while the UV and infrared are blocked out permanently by other filters, such as glass, a device incorporating the present photochromic material provides the desired degree of protection. Assuming the 0.025 cal./cm.$^2$ to be the radiant energy incident on the device and that this emanates from the initial spike of a nuclear blast, the total exposure of the person wearing the device to radiant energy from spike plus the subsequent fireball is ~2.5 cal./cm.$^2$. This is less than the exposure required to produce first degree burns. Thus, the combined filter is actuated directly by the light from the spike which has a rise time of several microseconds, and then retains its color (and protection) for the duration of the life of the fireball.

EXAMPLE 81

Three separate rods were made up by Method 1 containing: (a) Dibenz[a,h]anthracene (5×10$^{-4}$M) (RRI-6383), (b) Dibenz[a,h]anthracene (5×10$^{-4}$ M) plus Pyrazine (5×10$^{-4}$M), and (c) Dibenz[a,h]anthracene (5×10$^{-4}$M) plus Thianthrene (5×10$^{-4}$ M). Cylindrical samples were produced having a diameter of 9 mm. and lengths of 1.5 cm., the end faces being ground and polished. The T T cm., the end faces being ground and polished. The T T absorption spectra were obtained using a xenon spiral flash lamp (300μf./4,100 v.) for excitation. Under these conditions the rods absorb the violet and blue light (4,000–4,700 A.) transmitted by (a) and also absorb most (~98–99 percent) of the orange and red light transmitted by (a).

The pyrazine and thianthrene give an indication of improving the optical density, over that achieved by the same concentration for dibenz[a,h]anthracene alone. The efficiency of energy transfer is impaired by the large intermolecular separations encountered in dilute solid solutions.

The sue of two or more photochromic materials, each blocking the windows in the spectrum of the other or others, is an important part of the present invention.

EXAMPLE 82

The total luminescence (fluorescence plus phosphorescence) spectra of all three rods of Example 81 were photographed on a fast grating spectrograph on Kodak 103a-F plates. The photographic materials were calibrated for the relationship between optical density and exposure by means of an eight-step rotating sector (ratio 1:2 from step to step) used in conjunction with a standard tungsten filament lamp of known color temperature. By heterochromatic photographic microphotometry, relative intensities of the emitter luminescence were evaluate. The areas under these curves were integrated and the ratios of (Intensity of Phosphorescence/Intensity of Fluorescence) were evaluated for each spectrum. The values were over 1:1,000. In all cases, luminescence and T'-T absorption studies, the energy of the light used for excitation was absorbed by the dibenz[a,h]anthracene alone and not by the matrix or by the additives. The additives, as it were, "steal" activation energy from molecules of the lowest excited singlet state of the dibnez[a,h]anthracene and expedite intersystem crossing to the lowest triplet state of the dibenz[a,h]anthracene. Because of this, a smaller percentage of the energy of excitation absorbed by the dibenz[a,h] anthracene is wasted in fluorescence and a larger percentage is utilized in effecting T'-T absorption. The magnitude of the effect varies with concentration, and the propinquity of the molecules to each other in the matrix.

Thirteen individual molecules were added in equimolar amounts to plastic samples containing 5×10$^{-4}$M dibenz[a,h]anthracene. These compounds are listed in Table 3 along with the lowest triplet and lowest excited singlet of each additive.

Table 3

Compounds Added to Dibenz[a,h]anthracene For a Synergistic Effect

| | Lowest Triplet cm.$^{-1}$ | Lowest Excited Singlet cm.$^{-1}$ |
|---|---|---|
| Pyrazine —RRI-250 | 25,974 | 30,600 |
| Benzamide | 19,800 | 37,037 |
| 2-Bromo-naphthalene | 21,053 | 24,390 |
| Naphthalene—RRI-1754 | 21,100 | 31,716 |
| 1,10-phenanthroline—RRI-3480 | 22,200 | 34,483 |
| Thianthrene—RRI-3449 | [~20,000] | 38,900 |
| Biphenyl | 22,780 | 40,322 |
| Fluorene—RRI-3127 | 23,753 | 33,333 |
| Benzophenone | 24,096 | 29,850 |
| Benzophenone oxime | — | ~34,500 |
| Anthracene—RRI-3618 | 14,700 | 26,631 |
| Triphenylene—RRI-5256 | 23,753 | 28,690 |
| Chrysene—RRI-5254 | 20,000 | 27,778 |

For comparison:
| Dibenz[a,h]anthracene—RRI-6383 | (18,300) | (26,000) |

EXAMPLE 83

The samples described in Example 81 were examined in a rotating can phosphoroscope. The decay constants of the phosphorescence emission from the metastable state of dibenz[a,h]anthracene were determined. The intensity of phosphorescence is given by $$I = I_o \exp(-t/\tau_m)$$

where $I_o$ is the intensity at some time $t_o$ taken as a starting point, and $I$ is that at some subsequent time, $t$. The decay constant or mean lifetime, $\tau_m$, is the time in seconds for the intensity to decay to $1/e$ (~37 percent) of its value at $t_o$. The values of $\tau_m$ measured were:

| | $\tau m^{25°}$ (sec.) | $\tau m^{78°K}$ (sec.) |
|---|---|---|
| *Dibenz[a,h]anthracene, 5×10$^{-4}$M plus Thianthrene, 5×10$^{-4}$M | ~0.6 | ~0.75 |
| Dibenz[a,h]anthracene, 5×10$^{-4}$M plus Pyrazine, 5×10$^{-4}$M | 0.73 | 1.12 |

*Individual determinations on this sample gave a scattering of values

Other things being equal, the longer the lifetime, the larger the population of the metastable state which can be achieved by the primary absorption of a given amount of exciting light.

These results are extremely important because they show that under the conditions here used, of comparative freedom from molecular oxygen, and polymerization catalysts, and breakdown products thereof, the system has a useful mean lifetime at 25° C., that is near usual room temperatures. At 78° K. molecular, or free, oxygen is immobilized. In the system of this example it is very nearly absent, at room temperature.

EXAMPLE 84

Using two rods, each 1.5 cm. long, the first containing $5\times10^{-4}M$ dibenz[a,h]anthracene plus thianthrene, $5\times10^{-4}M$, and the apparatus employed in Example 80, intensity versus time decay curves to T'–T absorption were measured. At 5,400 A., 120 μsec. after the onset of the flash, both samples had essentially the same transmittance (16 percent).

The materials in Table 3, when present, improve the desirable photochromic effect —larger quantities can give larger improvements. For energy transfer of the type here illustrated, the properties possessed by the additive molecule (component B) are the following: a. Its lowest excited singlet (S'B) should lie above S'A so that component A will absorb most of the light in the near ultraviolet.

b. Its lowest triplet ($T_B$) should lie above $T_A$ and below S'A.

c. It should not show fluorescence.

d. It should contain one or more hereto atoms to enhance the rate of intersystem crossing.

The locations of energy levels can be measured spectroscopically For two molecules of comparable molecular weights, the zero point energies (sum of one-half quantum of each vibrational frequency in the ground state) will be comparable, and the ground states of two such molecules will be fairly close together on an absolute energy scale. It is further predicted that in the solid phase, energy transfer can occur not only between S'A and $T_A$ (both belonging to A) but also from S'A to $T_B$ and from $T_B$ to $T_A$. When conditions are set up so that these radiationless energy transfers do occur, the following benefits result:

i. By stealing energy out of S'A at a faster rate via $T_A$ and $T_B$, the excitation energy lost via fluorescence is diminished.

ii. The population of $T_A$ is increased thereby enhancing the T'–T absorption of component A.

EXAMPLE 85

2.8 milligrams of benzo[b]chrysene (RRI–6379) and 20 g. of X-ray polymerized polymethylmethacrylate containing less than 0.2 percent of methylmethacrylate monomer were completely dissolved in 500 ml. of reagent-grade benzene by shaking in a closed, all-glass container. The solution was then freeze-dried under vacuum to remove the benzene, leaving a porous, fluffy solid product. Approximately 8 grams of this material was compression molded to form a solid, transparent cylinder 9 mm. in diameter. From this, a section 15.5 mm. long was cut and the two end faces ground and polished to from a test specimen 15 mm. long. This was subjected to flash excitation (2,500 Joules electrical input to spiral flash lamp) and the T'–T absorption spectrum was photographed. The results were excellent and comparable with those presented in Example 48.

EXAMPLE 86

The same procedure employed in the preceding Example, 85 with polymethylmethacrylate was used except that other different commercial grade, optical quality, thermoplastic polymers were substituted for the polymethylmethacrylate in individual samples. The types of polymers included the following:

| | | |
|---|---|---|
| Cellulose acetate | Polycarbonate | Polyvinylchloride. |
| Cellulose propionate | Polystyrene | Polystyrene-butadiene. |
| Cellulose acetate butyrate | Polymethyl styrene (m,p). | |

After freeze drying, the solid residues were compression molded employing the standard temperatures and pressures recommended by the manufacturers of the various polymeric materials. Cylindrical samples 15 mm. long by 9 mm. in diameter with plane polished end faces, using a 2,500-Joule flash show the following T'–T absorption:

[T''T absorption of benzo[b]chrysene (RRI–6379) $5\times10^{-4}$ molar, in Commercial Optical-Quality Plastics. Samples compression molded. Length 15 mm., diameter 9 mm.; flash 300 μf./4,100 volts]

| Thermoplastic polymer | Quality of T''T absorption spectrum as prepared+ | Quality of T''T absorption spectrum after pumping* |
|---|---|---|
| Cellulose acetate | Fair | Fair to Good. |
| Cellulose propionate | do | Do. |
| Cellulose acetate butyrate | do | Do. |
| Polycarbonate | Good | Excellent. |
| Polystyrene | do | Good. |
| Polymethylstyrene | do | Do. |
| Polyvinylchloride | Fair to good | Do. |
| Polystyrene-butadiene | Good | Do. |

*90° C., forepump vacuum (~0.01 mm.) with liquid nitrogen trap for 30 minutes.
+All ratings are made relative to the performance of the same photochromic material in a matrix of polymethylmethacrylate polymerized in vacuum by the preferred Method 1.

The results show that oxygen in the plastic matrix can be removed at least in part by evacuation, after which the plastic can be sealed to prevent reabsorption of oxygen.

EXAMPLE 87

Benzo[b]chrysene (RRI–6,379) crystals were dissolved in benzene to from a 0.1 percent solution. This was freeze dried so as to provide the photochromic material in a form which was partly amorphous and partly microcrystalline. This was then milled with powdered, unfilled melamine-formaldehyde thermosetting plastic molding powder. The mechanical mixture ($5\times10^{-3}$ molar in benzo[b]chrysene) which resulted was then compression molded so as to form a clear disc 2 inches in diameter by one-eighth inch thick. From this was cut a rectangular piece 1×⅜×⅛ inches which was tested for T'–T absorption in the flash unit with the ⅜-inch side being vertical and with the perpendicular to the broad face inclined at an angle of 30° (in a horizontal plane) to the directly transmitted analyzing beam. When flashed (2,500 Joules electrical input to flash lamp) the T'–T absorption spectrum was fairly good. When the sample was heated in vacuum for 30 min. at 100° C. and then retested, the performance was favorable in comparison to that exhibited by the specimen tested in Example 85.

EXAMPLE 88

In 9.5 ml. of pure methylmethacrylate monomer plus 0.5 ml. ethylene glycol dimethacrylate were dissolved 0.0008 g. (80 parts per million) azo-bis-iso-butyronitrile and 0.014 g. ($5\times10^{-4}$ molar) dibenz[a,h]anthracene (RRI–6,383). The clear solution was transferred to a standard sample preparation tube, degassed, sealed off, heated at 60° C. for 16 hours and then at 100° C. for 24 hours, cooled, and opened. From the cylindrical sample formed, a test specimen 15 mm. long by 9 mm. in diameter is prepared with plane polished end faces. When flashed (2,500 Joules), the T'–T absorption obliterates all light having wavelengths less than 5,900 A. (optical density >3.0).

EXAMPLE 89

In 9.5 ml. of methylmethacrylate plus 0.5 ml. ethylene glycol dimethacrylate were dissolved 0.0008 g. azo-bis-iso-butyronitrile, and 0.0014 g. ($5\times10^{-4}$ nthracene. The subsequent steps were the same as those detailed in Example 88. When flashed, the T' manifested by this sample was inferior to that exhibited by the X-ray polymerized sample (preferred method (a)) of Example 53. The sample polymerized by catalyst absorbed light only in the three bands centered at 5,720, 5,390, and 5,015 A.

EXAMPLE 90

In 9.5 ml. of methylmethacrylate plus 0.5 ml. ethylene glycol dimethacrylate were dissolved 0.0008 g. azo-bis-iso-butyronitrile, 0.0014 g. ($5\times10^{-4}$ molar) dibenz[a,h]anthracene, and 0.0012 g. ($5\times10^{-4}$ molar) thianthrene. The subsequent steps taken were the same as those detailed in Example 88. When flashed, the T'-T absorption manifested by this sample was inferior to that exhibited by the corresponding sample (Example 81) polymerized by the preferred Method 1. The sample polymerized by catalyst leaked light from 3,850 to 4,700 A.

EXAMPLE 91

In 123 ml. of purified methylmethacrylate plus 10 ml. ethylene glycol dimethacrylate were dissolved 57 grams polymethylacrylate, 0.0098 g. azo-bis-iso-butyronitrile, and 0.059 g. ($1.05\times10^{-}$molar) dibenzo[a,h]phenazine (R-RI-6,223) while nitrogen was bubbled through the solution to remove oxygen. This solution was transferred to a cavity one-fourth inch thick bounded by two flat sides consisting of the contiguous faces of two pieces of plate glass and by an irregularly shaped barrier of ¼×¼-inch polyvinylchloride strip gasket which had been heated previously in methylmethacrylate to remove plasticizers and polymerization inhibitors. Clamps were employed to apply pressure to the glass plates which, in turn, compressed the gasket. After filling the cavity while blowing nitrogen through both it and the solution, the open mouth of the cavity used for filling was closed by one end of the gasket. The following time-temperature schedule was employed to effect polymerization and cure:

| Temp. (°C.) | 51 | 65 | 82 | 100 | 120 | 105 |
|---|---|---|---|---|---|---|
| Time (hrs.) | 22 | ¼ | ½ | ¾ | ¾ | 16½ |

When a ¼-inch-thick specimen of this material was flashed, the intensity of T'-T absorption manifested was good (optical density >2.6 for $\lambda > 5,900$ A.) but was still inferior to that displayed by a sample containing a lower concentration of the same photochromic material but made up by the preferred Method (a) as shown in Example 30.

EXAMPLE 92

A solution of naphtho[2,3-a]coronene (R.I.S.-9,678) in benzene is freeze dried so as to yield a mixture of amorphous and microcrystalline product. This is mixed intimately with finely powdered Lexan polycarbonate in an atmosphere of dry nitrogen. The resulting mixture, $5\times10^{-3}$ molar in naphtho[2,3-a]coronene, is compression-molded in a dry nitrogen atmosphere to form a clear disk having a diameter of 2 inches and a thickness of 2 mm., which is sealed between two Pyrex glass disks having a 2-inch diameter and thickness, each, of 1.5 mm. to protect the plastic from atmospheric oxygen and water vapor. When examined in ordinary artificial room light, the disk shows a yellow color. When exposed to bright, noonday July sun at 41° north latitude on a clear day, the filter assembly shows a pale green color.

EXAMPLE 93

Using Method 1, a solution of 0.2 mg. of Naptho[2,3-a]coronene ($C_{32}H_{16}$, M. Wt. 400.4, R.I.S.-9,678) in 9.5 ml. methylmethacrylate monomer ($5\times10^{-5}$ molar) was degassed, sealed, X-irradiated and oven-cured. A rod 9 mm. in diameter by 1.526 cm. long with plane, parallel, polished windows cut therefrom was subjected to a steady-state excitation as described in Example 104. Values for $\lambda_{max}$, O.D./cm., and $\epsilon_{TT}$ as measured were:

| T'-T $\lambda_{max}$(A) | 6,540 | 6,140 shoulder | 5,490 | 5,120 | 4,500 |
|---|---|---|---|---|---|
| O.D./cm. | 0.442 | 0.148 | 0.086 | 0.052 | 0.101 |
| $\epsilon_{TT}$(l./M.cm) | $1.2\times10^4$ | $4.1\times10^3$ | $2.4\times10^3$ | $1.4\times10^3$ | $2.8\times10^3$ |

EXAMPLE 94

A sample of 95 percent polymethylemthacrylate, 5 percent ethylene glycol dimethacrylate which was $5\times10^{-4}$ molar in acenaphtho[1,2-b]benzo[f]quinoxaline (RRI-6,816), was prepared by preferred method 1. Test specimens 9 mm. in diameter and 15 mm. long and 5 mm. long were cut, then the end faces were ground and polished so as to be plane and essentially parallel. When the 15 mm. sample was flashed (2,500 Joules), all light of wavelengths equal to or less than 6,600 A. was obliterated with an optical density greater than 3.0. When the 5 mm. long sample was flashed (335 Joules), individual T'-T absorption bands could be distinguished having maxima at >6,600, 5,602, and 4,860 A. On repeated flashing, photochromic activity was diminished for these particular samples.

EXAMPLE 95

In 9.5 ml. of methylmethacrylate plus 0.5 ml. of ethylene glycol dimethacrylate were dissolved 0.0017 g. of benzo[a]naphtho[8,1,2-cde]naphthacene (RRI-7,373). This solution was polymerized by Method 1 and cured for 16 hours at 100° C. all in vacuum. The ends of a sample of the polymeric rod 9 mm. in diameter by 15 mm. long were ground and polished flat and parallel. The sample was yellow and showed complete absorption below 4,560 A. by the molecules in the ground state. When subjected to a big flash (2,500 Joules), the T'-T absorption removed substantially all light below 6,600 A. with an optical density >2.6 with the exception of two windows of slight transmission from 4,300 to 5,140 A. (O.D. >2.0) and 6,440 to 6,600 A. (O.D.>2.5).

EXAMPLES 96 to 101

The following Table shows the performance of certain photochromic materials whose separate individual characteristics have already been shown. All were prepared by Method 1, radiation of monomer 95 percent methylmethacrylate and 5 percent ethylene glycol dimethacrylate. These examples are designed to illustrate the advantages of multicomponent systems, and show how windows in the spectrum of a one-component photochromic material may be blocked by the addition of a second photochromic material whose spectrum blocks radiation at such wavelengths. Obviously, more components could be used, but the results would be less informative, even if more utilitarian. Thus, if component A had windows in its ground-state absorption and T'-T absorption centered at $G_{\lambda A}$ and $T_{\lambda A}$, while component B has windows at $G_{\lambda B}$ and $T_{\lambda B}$, and if these did not coincide, then it might be possible to mix such substances together in the same matrix if the molecules were compatible, if energy transfer processes would not interfere deleteriously, and if the ground-state molecules of the several components would not compete too strenuously for the primary exciting light. In spite of all these possible theoretical difficulties, table 8 shows certain pairs which have been found to work well together. Many other useful two-component or multicomponent systems exist, but more detail would unduly expand an already prolix description.

Table 8

T'T Absorption of Binary Mixtures

Example 96
(A) Dibenz[a,h]acridine (RRI-6,298) ($2.5\times10^{-4}$M)
plus
(B) Benz[b]acridine (RRI-5,140) ($2.5\times10^{-4}$M) 10 mm. long

| $\lambda$(A.) | O.D.–A | O.D.–B | Sum O.D.–(A,B) | O.D. Mixture |
|---|---|---|---|---|
| 5,897 | 1.68 | 2.46 | 3.14 | 1.08 |
| 5,418 | 2.43 | 1.02 | 3.45 | 1.33 |

Example 97
(A) Dibenz[a,h]anthracene (RRI-6,383) (1.67×10⁻⁴M)
plus
(B) Naphtho[1,2,3,4-def]chrysene (RRI-7,026) (2×10⁻⁴M) 15 mm. long

| λ(Å) | O.D.–A | O.D.–B | Sum O.D.–(A, B) | O.D. Mixture |
|---|---|---|---|---|
| 6,053 | 0.179 | >1.75 | >1.93 | 2.22 |
| 5,723 | 1.88 | >1.0 | >2.88 | 2.10 |
| 5,389 | 1.78 | 0.79 | 2.57 | 2.36 |
| 5,162 | 0.91 | 0.97 | 1.88 | 1.92 |
| 4,331 | 0.52 | 0.95 | 1.47 | 1.70 |

Example 98
(A) Benz[b]acridin-12(5H)-one (II) (5×10⁻⁴M)
plus
(B) Dibenzo[a,h]phenazine (RRI-6,223) (5×10⁻⁴M) 5 mm. long

| λ(A.) | O.D.–A | O.D.–B | Sum O.D.–(A,B) | O.D. Mixture |
|---|---|---|---|---|
| 5,897 | 2.12 | >1.0 | >3.12 | >1.74 |
| 5,177 | 0.38 | 1.99 | 2.87 | 1.49 |

Example 99
(A) Dibenz[a,h]anthracene (RRI-6,383) (5×10⁻⁴M)
plus
(B) Dibenzo[h,rst]pentaphene (RRI-7,381) (2.5×10⁻⁴M) 5 mm. long

| λ(A.) | O.D.–A | O.D.–B | Sum O.D.–(A,B) | O.D. Mixture |
|---|---|---|---|---|
| 5,723 | 1.88 | >0.54 | >2.42 | >1.39 |
| 5,389 | 1.78 | 0.29 | 2.07 | 1.40 |
| 5,187 | 1.39 | 0.83 | 2.22 | 1.24 |
| 4,321 | 0.51 | 0.79 | 1.30 | 1.01 |

Example 100
(A) Dibenz[a,h]acridine (RRI-6,298) (5×10⁻⁴M)
plus (B) Benz[b]acridine (RRI-5,140) (5×10⁻⁴M) 5 mm. long

| λ(A.) | O.D.–A | O.D.–B | Sum O.D.–(A,B) | O.D. Mixture |
|---|---|---|---|---|
| 5,890 | >1.82 | >1.44 | >3.26 | 2.31 |
| 5,418 | 2.43 | 0.30 | 2.73 | 1.87 |

Example 101
(A) Benzo[a]coronene (R.I.S. 9,650) (2.5×10⁻⁴M)
plus
(B) Dibenz[a,h]anthracene (RRI-6,383) (5×10⁻⁴M) 5 mm. long

| λ(A.) | O.D.–A | O.D.–B | Sum O.D.–(A,B) | O.D. Mixture |
|---|---|---|---|---|
| 5,723 | >1.89 | 1.88 | >3.77 | >1.91 |
| 5,687 | >2.00 | 1.48 | >1.91 | >3.48 |
| 5,389 | 1.24 | 1.78 | 3.02 | 1.84 |

Footnotes to Table 8 a) All samples were flashed with a helical Xenon flash lamp at 3000 volts and 75 μfarad using a neutral filter having 40 percent transmission in front of the slit of the spectrograph for ground-state (preflash) spectra and exposure times of 0.04 sec. By using the small flash and short samples, enough light was transmitted to pass some light at all wavelengths in the visible, even at the band maxima, thereby enabling determinations of optical densities achieved under the conditions employed.

b) The optical densities achieved at the various wavelengths with the binary mixtures were compared with those obtained at the same wavelengths using samples containing component A or component B alone. In addition, the product of (concentration) × (length) for each component remained constant.

c) In general, the optical density achieved at a given wavelength for the mixture is less than the sum of the optical densities at the same wavelength for the two pure components. This is to be expected since, in the mixture, the two individual components compete for the exciting light. Thus, component A absorbs part of the exciting light and decreases the intensity available for exciting component B and conversely for the effect of component B on component A.

d) Examination of the spectrograms and microphotometer tracings of said spectra show unequivocally that in the cases of the binary mixtures cited in this table, the windows in the T′T absorption of component A are blocked by T′T absorption of component B and vice versa.

e) It is both useful and unexpected that excited and highly reactive triplet molecules of unlike species can coexist and exhibit their T′T absorption spectra independently while in the same matrix without experiencing deleterious effects from complicated intermolecular energy transfers.

f) The data in this table cannot show the full scope of absorption. The real benefits derived from the use of such mixtures are best seen from an inspection of the full spectra. Microphotometric measurements of the spectra obtained in A alone, with B alone, and with the mixture (A & B) shows the full filtering effect. In practical use as a filter, an inspection of a continuous light source with all frequencies represented shows the unique and broad filtering action of a filter containing mixtures of photochromic materials.

EXAMPLE 102

In 9.5 ml. of methylmethacrylate plus 0.5 ml. of ethylene glycol dimethacrylate were dissolved 0.0014 g. of benzo[ghi]perylene (RRI (RRI-7,036) plus 0.0012 g. of benz[b]-acridin-12(5H)-one (II) plus 0.0014 g. of dibenz[a,h]-acridine (RRI-6,298). The material was polymerized at room temperature in vacuum by ionizing radiation and then cured at 100° C. for 16 hours according to Method 1. All three active ingredients were at concentrations of $5×10^{-4}$ molar. The preflash, ground-state absorption spectrum of a (yellow) sample 5 mm. long by 9 mm. in diameter indicated essentially continuous absorption below 4,680 A. with slight transmission windows centered at 4,471 A. and 4,130 A. When excited by a big xenon flash (2,500 Joules), continuous absorption with an optical density greater than 3.0 was observed at wavelengths below 6,200 A. for the 5 mm. sample. Some increases in transmission occurred from 6,200 to 6,600 A., which in a separate test was absorbed (optical density >3.0) by nonphotochromic, pale blue-green-colored glass 1.5 mm. thick placed in front of the slit of the spectrograph, thus blocking the entire spectrum visible to the normal human eye, plus the ultraviolet.

EXAMPLE 103

In 38 ml. of methylmethacrylate plus 2 ml. of ethylene glycol dimethacrylate were dissolved 0.012 g. of benzo[ghi]perylene ($1×10^{-3}$M), 0.048 g. of benz[b]-caridin-12(5H)-one ($5×10^{-3}$M), and 0.056 g. of dibenz[a,h]acridine ($5×10^{-}$M). The material was polymerized by Method 1, in vacuum in a sealed off, tubulated Pyrex culture flask while in a thin layer 6 mm. deep. The specimen was further cured for 16 hours at 100° C., cooled, cut open, and the resulting disk of polymeric material cut to a square 2×2 inches. The two broad faces were ground and polished to form an approximately plane parallel plate 2 mm. thick and 2 inches square. This was heated in vacuum for 24 hours at 75° C. to remove oxygen, after which nitrogen was admitted to the vessel containing the plate. Working in a dry box with a nitrogen atmosphere, the photochromic plastic plate was then sandwiched between two 2×2-inches plane polished Jena glass filters, the front glass being KG–3 (2.0 mm. thick), the rear glass being GB–18 (1.5 mm. thick). The optical densities of these two glass filters in series versus air at wavelengths from 0.3 to 3.0 μ are given in Table 9 below.

EXAMPLE 104

Using Method 2, 0.19 mg. of dibenzo[a,g]coronene ($C_{32}H_{16}$M.wt.400) (RIS–9,680) was dissolved in 9.5 ml. of methylmethacrylate monomer plus 0.5 ml. of ethylene glycol-dimethacrylate monomer to form a solution at a concentration of $4.75×10^{-5}$ Moles/Liter. This was placed in a hard glass vessel, subjected to three freeze-pump-evacuate-thaw cycles, vacuum sealed, and heated. A length of the resulting cylinder was made into a rod 1.469 cm. long × 0.9 cm. diameter with the two end faces ground flat and polished. This rod was subjected to steady-state excitation at a level of $9×10^{16}$ quanta/cm.² second lying in the ultraviolet region of the spectrum from 3,000 to 4,000 A. of which quanta more than 73 percent were in the vicinity of 3,650 A. The direction of excitation was perpendicular to the axis of the rod, that of observation being parallel thereto. The triplet-triplet absorption spectrum was photographed, and the resulting spectrograms microphotometered. The T′-T absorption bands ($\lambda_{max}$) and optical density per centimeter were found to be:

| T′–T $\lambda_{max}$ (A) | 7,000 | 6,264 | 5,970 | 5,660 | 5,060 (broad) |
|---|---|---|---|---|---|
| O.D./cm. | 0.650 | 0.645 | 0.581 | 0.516 | 0.217 |
| 4,300 | 4,020 | | | | |
| >1.66 | 0.774 | | | | |

Assuming approximately 80 percent ground-state depletion under this level of excitation for this dilute sample, this is a value of ~3.3 ×10⁴ Liter/Mole cm. for $\epsilon_{TT}$ of the strongest T'-T band at 4,300 A.

EXAMPLE 105

A quantity 0.188 mg. of tribenzo[b,n,pqr]perylene ($C_{30}H_{16}$, mol wt. 376, RRI-7,524) was dissolved in 9.5 ml. of methylmethacrylate monomer and 0.5 ml. of ethylene glycoldimethacrylate monomer, degassed, irradiated by X-rays and oven-cured by the procedure of Method 1. From the cured cylindrical sample, a rod 9 mm. in diameter by 1.465 cm. long with plane, parallel, polished windows was prepared and excited in the steady-state source used in Example 104. There is one principal T'-T band in this compound which is quite broad and is centered at 4,740 A. At this wavelength the value of optical density/cm. from T'-T absorption was found to be 0.937. Well out on the shoulders of this band absorbance (O.D.) values of 0.162/cm. and 0.242/cm. were measured at $\lambda\lambda 5{,}744$ and 4,470, respectively. The value of $\epsilon_{TT}$ at $\lambda_{max}$ was estimated to be ~2×10⁴ L/M. cm.

Because the molecules in the triplet state are essentially biradicals, and have two free electrons with the same spin, each of the electrons is very active and reacts with molecular or free oxygen. As above disclosed, the present filter can be prepared in the absence of atmospheric oxygen or other oxygen source, or the oxygen can be removed by vacuum, so as to leave the filter oxygen-free, at the time of use.

The photochromic filter can be protected from molecular oxygen by protective layers of glass, or other materials through which gaseous oxygen does not diffuse. By oxygen-free is meant that the amount of molecular oxygen present is so small as not to affect unduly the photochromic action of the filter. If the molar concentration of oxygen is small, say less than 5 percent of the molar concentration of the photochromic material, the loss is small enough to be acceptable. Also, even if the filter layer is not initially free from oxygen, heating in vacuum permits the oxygen to diffuse out, to give an oxygen-free filter, at time of use.

If free (molecular) oxygen is present, or if residual monomer is present in reactive quantities, the T'-T absorption and filtering effect is reduced, or the triplet form reacts, instead of absorbing light.

Example 106

A quantity 0.185 mg. of benzo[a]coronene ($C_{28}H_{14}$, M. Wt. 350.32, RIS 9,650) was added to 9.055 g. of the diglycidyl ether of bisphenol A (Dow Epoxy Resin 332) and heated to 65° C. until the former dissolved in the molten resin. To this was added 0.135 g. of trimethylolpropane which was dissolved by heating to 75° C. after which the solution was cooled to 65° C. and 0.811 g. of diethylenetriamine added with stirring. The clear solution was then poured into a hard glass test tube of 9 mm. bore whose interior previously had been treated with a release agent (ReleasaGen) and buffed to remove all excess. The tube was kept at 65° C. for about 50 minutes after which the temperature was lowered to 40° C. after one additional hour the source of heat was removed and the sample permitted to sit at temperature ( 10 25° C.) overnight. The sample was then heated at 75° C. for about 8 hours and finally at 100° C. for 30 minutes after which it was permitted to cool and could be removed from the tube. Because of the temperature of the reaction, air was essentially insoluble. From the cylindrical sample thus formed (6×10⁻⁵ molar) a section 1.5 cm. long by 0.9 cm. in diameter was provided with plane-parallel, polished windows at either end, and the T'-T absorption spectrum photographed using steady-state excitation employing the method described in Example 104. When the epoxy sample was compared with its poly(methyl methacrylate) analogue (same concentration, same size and same level of excitation), the epoxy sample gave a stronger photochromic effect which was more pronounced at a lower level of excitation. The results are shown below.

| Matrix | $C_o$(M/L) | (T'-T) $\lambda_{max}$.(A) | Optical density/cm. Exc. 1× | Exc. 10× |
|---|---|---|---|---|
| PMMA | 6×10⁻⁵ | 5,670 | 0.449 | 0.822 |
|  |  | 4,155 | 0.623 | 1.14 |
| Epoxy | 6×10⁻⁵ | 5,875 | 0.467 | 0.855 |
|  |  | 4,200 | 0.860 | 1.19 |

PMMA is poly(methyl methacrylate).

i. The wavelengths of the T'-T absorption bands shift to the red in going from poly(methyl methacrylate) to Epoxy.
ii. The headings Exc. 1× and 10× refer to (1 times sunlight) and (10 times sunlight) in terms of quanta/cm.² second incident on sample in the region 3,000 to 4,000 A.
iii. The mean lifetime of the molecules in the lowest (metastable) triplet state in Epoxy (4.5 seconds) is nearly twice that in poly(methyl methacrylate) (2.3 seconds) at 25° C.
iv. This increase in lifetime explains the enhanced photochromic performance of the epoxy sample over the poly(methyl methacrylate) sample at 1× sunlight.
v. At 10× sunlight, because of the low value of $C_o$ in the samples, more than 90 percent of the ground-state molecules are pumped into the triplet state in both samples; hence, their performances are essentially identical.

Table 9

Optical Densities Of Supplementary Glass Filters

| $\lambda(\mu)$ | O.D. and (Percent Transmission) | $\lambda(\mu)$ | O.D. | $\lambda(\mu)$ | O.D. |
|---|---|---|---|---|---|
| 0.3 | >3.8 | 0.7 | 3.55 | 1.8 | 2.31 |
| 0.35 | 0.56 | 0.75 | >3.9 | 2.0 | 2.18 |
| 0.4 | 0.31 | 0.8 | >4.2 | 2.2 | 2.24 |
| 0.45 | 0.22 (65.8) | 0.9 | >5.0 | 2.4 | 1.91 |
| 0.5 | 0.15(82.4) | 1.0 | >5.7 | 2.6 | 2.24 |
| 0.55 | 0.19(72.1) | 1.2 | 5.8 | 2.8 | 3.67 |
| 0.6 | 0.59(22.9) | 1.4 | >4.7 | 3.0 | 5.6 |
| 0.65 | 1.67 | 1.6 | 3.11 |  |  |

Optical Density = $\log_{10}$ ( 1/T )
1$\mu$=10,000A

The front filter absorbs ultraviolet strongly below 3,100 A., transmits well at wavelengths greater than 3,300 A. and up to 7,500 A., beyond which it absorbs strongly throughout the infrared. The front filter is nearly colorless. The rear filter is a pale blue-green color whose function is to absorb deep red light (wavelengths greater than 6,200 A.) which is often difficult to remove by T'-T absorption and to augment the filtering action of KG-3 in the infrared. The sandwich was clamped in a swivel holder employed in binding the edges of lantern slides, and the entire perimeter was bound with several layers of plastic tape. The outer surface of the tape was painted with clear Glyptal varnish which was permitted to harden in the nitrogen atmosphere and was then baked with a heat lamp. These precautions were taken to minimize deleterious effects from oxygen. A similar sample was prepared in which the starting materials for the plastic plate consisted solely of methylmethacrylate and ethylene glycol dimethacrylate. The total transmissions of the samples were measured by using a ballistic thermopile. A short quartz flash lamp containing air was employed with a 5 microfarad energy discharge capacitor having a self-inductance of only 0.015 $\mu$henry. Adjustments were made in the voltage and in the distance from the lamp to the porthole of the ballistic thermopile until 0.03 calorie/cm.² flash was measured, with duplicate glass filters only in front of the porthole. By additional measurements made with a photoelectric spectrometer and oscilloscope, it had already been ascertained that the time required for the flash to reach peak intensity was about 6$\mu$seconds. With the control sample (no photochromic agents added) directly in front of the porthole of the ballistic thermopile, the percentage of the energy transmitted was about 80 percent of the total energy transmitted by the glass filters alone. When the same conditions were employed with the photochromic plastic sample sandwiched between the two glass plates in front of the porthole, the percentage of the total energy transmitted was only about 1 percent, thereby indicating that an average optical density of about 2 was achieved by the plastic throughout the region 3,150–6,200 A. during the time interval allotted to the duration of the flash, about 12 μseconds. Separate determinations of transmission versus time measured at 5,400 A. using the photoelectric spectrometer and oscilloscope, showed that 90 percent of the maximum color generated by the radiation from the same total flash (same distance from lamp to sample) employed in the preceding experiments was achieved by the time that the flash reached its peak intensity and that the sample achieved a maximum optical density of nearly 4 before the flash was entirely spent (12 μseconds).

As is obvious from the above Examples, one of the important uses of the present photochromic material is in combination with conventional, slower acting photochromic materials, as for example, using a conventional sensitive photochromic material for low-light intensities and the present high-speed photochromic material for bursts of light of higher intensity.

Much of the above experimental data is on specimens which are irradiated by a source, in many instances a flash, at an angle of 90° to the beam of light being transmitted by the sample, which removes some or all of the light after flashing. This is particularly useful in measuring activation, since the angular separations of the exciting light and the analyzing beam clearly distinguished the activating radiation from the filtered (transmitted) radiation. In practical and commercial uses, in many instances, the activating radiation and the radiation being filtered will be from the same source, or essentially colinear. Any direction of activating radiation and radiation being filtered may be used which fits the practical geometry of the particular application for which the filter system is being constructed.

Uses include a layer in a photochromic lens so that the photochromic material automatically adjusts the exposure instead os requiring that the shutter or aperture be changed. This permits the use of flash photography without the necessity of adjusting for exposure at varying distances. By having a layer of photochromic material just ahead of the negative, highlights can be protected.

The storage stability of the present material and its repeated usability permits incorporation in optical equipment having a long useful life. Edge sealing between glass layers, which may also be filters, or lenses, is one good method of excluding oxygen for a long useful life.

For flash control, obviously, supplementary filters can be chosen to control the transmitted light for any chosen purpose. If the flash is from nuclear sources, the most useful range is the visible region for eye protection in humans, with supplemental filters protecting other spectral regions. For photographic or other purposes a different region may be of primary importance, so the supplementary filters and photochromic materials are selected to be excited by more energetic shorter wavelength energy from the same source or other suitable source to control a less energetic longer wavelength radiation significant for a chosen purpose.

For example, a first filter, conveniently of glass, can be chosen which absorbs radiation shorter than 3,150 A. and which preferably can also absorb in the infrared region, namely absorbing strongly at wavelengths greater than 7,000 A. Such a filter passes radiation capable of activating the photochromic material in the plastic layer, which photochromic material itself may absorb radiation shorter than about 4,500 A. and frequently less than 4,200 A. by ground-state absorption, as well as radiation shorter than about 6,500 to 7,000 A. by T'–T absorption when excited, with a final glass filter which absorbs radiation starting at from 6,500 to 7,000 A. and longer and which may additionally absorb any radiation less than 4,000 A. not absorbed by prior layers. The use of supplementary glass filters is shown in Example 103. Other suitable filter system components are available commercially.

The third layer, or last filter can be of glass, which has supplementary filtering characteristics. For instance, as shown above, the last filter can absorb only deep red, and infrared, but may also be chosen to absorb residual ultraviolet, if any, and any desired portion of the visible spectrum not absorbed by the photochromic material in the excited state, as for example, sunglasses which are always designed to reduce light intensity, or which will provide permanent light intensity reduction at selected wavelengths even when the photochromic material is not activated.

For sunglasses, the permanent filter on the emergent light side is preferably opaque to ultraviolet, deep red and infrared radiation, and can preferably have maximum transmission in the regions to which the human eye is most sensitive, which is about 5,400 to 5,500 A.

As shown by the Examples, the preferred photochromic materials are polynuclear aromatic compounds preferably soluble in polymerizable monomers and if homocyclic of at least 5 rings and preferably with 5- or 6-membered rings having essentially aromatic conjugation even if 5-membered and if less than 5 rings having at least one heterocyclic atom in the conjugated ring system. Because the preferred characteristics for different purposes may vary, the preferred photochromic materials also vary. Obviously, the alkyl, particularly the lower alkyl derivatives of these compounds are equally suitable. A few lower alkyl groups do not have a major effect on the frequencies of a particular compound.

Phosphorescence is a necessary but not a sufficient condition. The measurement of triplet levels by conventional techniques for detecting such characteristics furnishes a rapid effective method of selecting a photochromic material or mixture within the broad class which is useful for a particular application. No one filter system is preferable under all conditions. A particular filter system is chosen, within the broad classes disclosed, for a particular application, based upon activating frequencies, frequencies to be absorbed, and preferred optical density.

As used in the claims, a photochromic filter is a filter for reducing the intensity of radiant energy, without necessarily randomizing either the polarization or direction, with the optical density being increased for at least certain wavelengths by the incidence of photons of another shorter wavelength, either simultaneously, or shortly previously, and which shorter wavelength may be from either a common source, or at any other angle of incidence to the filter. One use of such filters is for reducing the intensity of visible light, with activation by ultraviolet light, but the exciting radiation may be at least in part in the segment of the spectrum visible to the human eye, and the attenuated radiation can be either all or part of the spectrum visible to the human eye, and include longer and shorter wavelength radiation.

The use of such filters stable at ambient temperatures is both useful and unexpected, as is the discovery of a matrix in which particularly reactive metastable molecules, more especially triplet organic molecules, are stabilized at all temperatures below +100° C. This includes the particularly useful range of the comfort zone of 15° C. to 25° C. The limitation including room temperature in the claims accentuates the utility of a filter useful in the range of 15° C. to 25° C., but in no way limits use to this range. Outside of this range, an upper limit is the softening point of the plastic matrix, and the lower useful limit is determined by the lower useful temperature on the plastic itself, which of course, is not necessarily the same for all uses. No climatic temperature range encountered on the earth's surface is outside the useful operable range. The activity of the photochromic compounds individually described is enhanced by the blocking of "windows," that is regions of low optical density when excited, in one material by the presence of another material having strong absorption in the "window"

We claim:

1. The method of forming a photochromic filter comprising dissolving (a) substantially pure polymer in solvent and which polymer is solid at room temperature, (b) adding thereto at least one photochromic material, the molecules of which have a polynuclear conjugated condensed aromatic ring system, which system has a set of electronic energy levels such that at least one of said levels is metastable and characterized by having strongly-allowed transitions from the metastable level to higher electronic states whose energy spacings relative to the metastable state correspond to energies of photons capable of exciting a visual response in the retina of the human eye, namely whose wavelength is in the range of 4,000 to 7,500 A. units, and which metastable energy level is populated by producing a redistribution of the electrons such that the electronic configuration peculiar to the ground state is altered to the electronic configuration characteristic of the metastable state when the ground-state molecules are subjected to excitation by photons having energies greater than that corresponding to photons having a wavelength of about 6,000 A., (c) freezing the solution, and evaporating the solvent at below its freezing point, thereby resulting in a finely divided polymer powder having substantially uniformly dispersed therein said photochromic material, and (d) molding the powder to the desired filter shape by pressure while substantially excluding oxygen.

2. A method of preparing a storage stable photochromic filter consisting of preparing a filter as in claim 1 and sealing the same between sheets of glass with a gaseous oxygen excluding seal, thereby excluding atmospheric oxygen.

3. A method of preparing a photochromic filter comprising dissolving in a solvent (a) a polymer substantially free from oxygen and active centers capable of reacting with free radicals and biradicals and which polymer is solid at room temperature, (b) at least one photochromic material, the molecules of which have a polynuclear conjugated condensed aromatic ring system, which system has a set of electronic energy levels such that at least one of said levels is metastable and characterized by having strongly allowed transitions from the metastable level to higher electronic states whose energy spacings relative to the metastable state correspond to energies of photons capable of exciting a visual response in the retina of the human eye, namely whose wavelength is in the range of 4,000 to 7,500 A. units, and which metastable energy level is populated by producing a redistribution of the electrons such that the electronic configuration peculiar to the ground state is altered to the electronic configuration characteristic of the metastable state when the ground-state molecules are subjected to excitation by photons having energies greater than that corresponding to photons having a wavelength of about 6,000 A., (c) casting the solution into the desired shape for the filter, and (d) removing the solvent by evaporation, at least the last portions of the solvent being removed by vacuum and mild heating, thereby simultaneously removing oxygen, thus forming a photochromic filter.

4. A method of preparing a storage stable photochromic filter consisting of preparing a filter as in claim 3 and sealing the same between sheets of glass with a gaseous oxygen excluding seal, thereby excluding atmospheric oxygen.

5. A method of preparing a photochromic filter comprising (a) dissolving at least one photochromic material in a polymer forming monomer, (b) removing uncombined oxygen by subjecting to vacuum, and (c) while being retained free from uncombined oxygen, (d) subjecting to a polymerizing dose of high-voltage ionizing radiation, and heat, thereby polymerizing substantially all of the monomer, so that the filter is substantially free from uncombined oxygen, and has less than 1.5 percent residual monomer, said photochromic material having molecules which have a polynuclear conjugated condensed aromatic ring system, which system has a set of electronic energy levels such that at least one of said levels is metastable and characterized by having strongly allowed transitions from the metastable level to higher electronic states whose energy spacings relative to the metastable state correspond to energies of photons capable of exciting a visual response in the retina of the human eye, namely whose wavelength is in the range of 4,000 to 7,500 A. units, and which metastable energy level is populated by producing a redistribution of the electrons such that the electronic configuration peculiar to the ground-state is altered to the electronic configuration characteristic of the metastable state when the ground-state molecules are subjected to excitation by photons having energies greater than that corresponding to photons having a wavelength of about 6,000 A.

6. A method of preparing a storage stable photochromic filter consisting of preparing a filter as in claim 5 and sealing the same between sheets of glass with a gaseous oxygen excluding seal, thereby excluding atmospheric oxygen.

7. The method of claim 5 in which the monomer is essentially pure methylmethacrylate.

8. The method of claim 5 in which the monomer is methylmethacrylate which additionally has present from 1 to 5 percent by weight of ethylene glycol dimethacrylate.

9. A storage stable photochromic filter effective at room temperature comprising a polymeric material solid at room temperature having dispersed therein at least (I) one photochromic material, the molecules of which have a polynuclear conjugated condensed aromatic ring system, which system has a set of electronic energy levels such that at least one of said levels is metastable and characterized by having strongly allowed transitions from the metastable level to higher electronic states whose energy spacings relative to the metastable state correspond to energies of photons capable of exciting a visual response in the retina of the human eye, namely whose wavelength is in the range of 4,000 to 7,500 A. units, and which metastable energy level is populated by producing a redistribution of the electrons such that the electronic configuration peculiar to the ground state is altered to the electronic configuration characteristic of the metastable state when the ground-state molecules are subjected to excitation by photons having energies greater than that corresponding to photons having a wavelength of about 6,000 A., and said polymeric material additionally having dispersed therein (II) an intensifying synergistic compound having an aromatic ring system, which intensifying compound
   a. has its lowest excited singlet above the lowest excited singlet level of the photochromic material;
   b. has its lowest triplet above the lowest triplet of the photochromic material and below the lowest excited singlet of the photochromic material;
   c. does not fluoresce; and
   d. has a high rate of crossing, (III) said photochromic material and said synergistic compound being protected from atmospheric oxygen by an uncombined oxygen resistant barrier.

10. The photochromic filter of claim 9 in which the photochromic material has present at least two photochromic compounds in which absorption windows of one compound are blocked by another photochromic compound present.

11. A storage stable photochromic filter consisting essentially of three layers, in order from a light source, (A) a glass filter transparent to ultraviolet light and which absorbs in the infrared region; (B) a photochromic filter as defined in claim 9; and (C) a glass filter which is substantially opaque to ultraviolet, deep red, and infrared radiation, and which reduces the intensity of the entire visible spectrum, but has its maximum transmission in the region of 5,400 to 5,500 A., and the human eye is most sensitive. namely 12. A storage stable photochromic filter effective at room temperature comprising a polymeric material solid at room temperature and having less than about 1.5 percent residual monomer, and being substantially free from uncombined oxygen and active centers capable of reacting with free radicals and biradicals having dispersed therein a photochromic material, the molecules of which have a polynuclear conjugated condensed aromatic ring system, which system has a set of electronic energy levels such that at least one of said levels is metastable an d characterized by having strongly allowed transitions from the metastable level to higher electronic states whose energy spacings relative to the metastable state correspond to energies of photons capable of exciting a visual response in the retina of the human eye, anmely whose wavelength is in the range of 4,000 to 7,500 A. units, and which metastable energy level is populated by producing a redistribution of the electrons such that the electronic configuration peculiar to the ground state is altered to the electronic configuration characteristic of the metastable state when the ground-state molecules are subjected to excitation by photons having energies greater than that corresponding to photons having a wavelength of about 6,000 A., said photochromic material being protected from atmospheric oxygen by an uncombined oxygen resistant barrier.

13. The photochromic filter of claim 12 in which the photochromic material comprises at least one material having a polynuclear conjugated aromatic system selected from the systems listed in table 1 and table 2, and the polymeric material solid at room temperature is selected from the group listed in table 5.

14. The photochromic filter of claim 13 in which the photochromic material, at least in part, consists of benzo[a]coronene.

15. The photochromic filter of claim 12 in which the uncombined oxygen resistant barrier consists of
a first layer of glass on one side of the polymer layer which glass is a filter transparent to ultraviolet light and which absorbs in the infrared region,
a second layer of glass on the other side which is substantially opaque to at least ultraviolet radiation,
and an oxygen resistant seal around the edges of the glass layers to prevent diffusion of oxygen through the edges of the thus-formed filter.

16. The photochromic filter of claim 15 in which said second layer is a glass filter which is substantially opaque to ultraviolet, deep red, and infrared radiation, and which reduces the intensity of the entire visible spectrum, but has its maximum transmission in the region of 5,400 to 5,500 A., to which the human eye is most sensitive.

17. The method of reactivating a photochromic filter consisting of
a. a polymer substantially free from oxygen and active centers capable of reacting with free radicals and biradicals and which polymer is solid at room temperature,
b. in which is dissolved in solid solution at least one photochromic material, the molecules of which have a polynuclear conjugated condensed aromatic ring system, which system has a set of electronic energy levels such that at least one of said levels is metastable and characterized by having strongly allowed transitions from the metastable level to higher electronic states whose energy spacings relative to the metastable state correspond to energies of photons capable of exciting a visual response in the retina of the human eye, namely whose wavelength is in the range of 4,000 to 7,500 A. units, and which metastable energy level is populated by producing a redistribution of the electrons such that the electronic configuration peculiar to the ground state is altered to the electronic configuration characteristic of the metastable state when the ground-state molecules are subjected to excitation by photons having energies greater than that corresponding to photons having a wavelength of about 6,000 A.,
c. and which has been substantially inactivated by atmospheric oxygen diffusing thereinto
d. comprising heating under high vacuum until substantially all uncombined oxygen has diffused out of said filter.

* * * * *

UNITED STATES PATENT OFFICE
CERTIFICATE OF CORRECTION

Patent No. 3,635,544      Dated   January 18, 1972

Inventor(s) Robert Franz Stamm, Jacob Solomon Brinen, Evalyn Hosterman Tennant & Frederick Halverson It is certified that error appears in the above-identified patent and that said Letters Patent are hereby corrected as shown below:

Abstract of the Disclosure, line 3 after "7,500 Angstroms" insert -- is increased when subject to radiation shorter than 6,000 Angstroms --.

Column 1, line 54 "minutes" should read -- minute --.

Column 2, line 23 "chlorioretinal" should read -- chorio-retinal --.

Column 2, line 50 "1589-1969" should read -- 1589-1606 --.

Column 3, lines 17-18 "solutions" should read -- as that of --.

Column 3, line 63 "The benidine" should read -- Thebenidine --.

Column 7, line 3 "Exampel" should read -- Example --.

Column 17, second formula " C $H_{16}N_2$" should read -- $C_{24}H_{16}N_2$ --.

Column 21, Table 2 "T,T" should read -- T'T --.

Column 21, Table 2, No. 1 "Permidine" should read -- perimidine --.

Column 23, No. 3, insert "(" before -- 4,5-iminophenanthrene) --

Column 23, No. 5 "$C_{16}HAs_{10}N$" should read -- $C_{16}H_{10}AsN$ --.

Coulumn 23, No. 6 "RI 5001" should read -- RRI 5001 --.

UNITED STATES PATENT OFFICE
CERTIFICATE OF CORRECTION

Patent No. 3,635,544　　　　　　Dated January 18, 1972

Inventor(s) Robert Franz Stamm, Jacob Solomon Brinen,
　　　　　　Evalyn Hosterman Tennant & Frederick Halverson It is certified that error appears in the above-identified patent and that said Letters Patent are hereby corrected as shown below:

Column 29, No. 3 "thoiphene" should read -- thiophene --.

Column 29, No. 5 "1311" should read -- 13H --.

Column 29, No. 6 "711" should read -- 7H --.

Column 29, No. 7 "711" should read -- 7H --.

Column 31, No. 1 "$C_{21}ll_{14}$" should read -- $C_{21}H_{14}$ --.

Column 33, No. 1 "$C_{22}ll_{19}N$" should read -- $C_{22}H_{19}N$ --.

Column 33, No. 2 "$C_{24}ll_{12}S$" should read -- $C_{24}H_{12}S$ --.

Column 36, line 38 "means" should read -- mean --.

Column 36, line 51 "condense" should read -- condensed --.

Column 38, line 24 "$(T_0 O)$" should read -- $(T_o)$ --.

Column 39, line 4 "coil" should read -- cold --.

Column 39, line 30 "cellulose" should read -- Cellulose --.

Column 39, line 47 "Polyvinylbutryal" should read
-- Polyvinylbutyral) --.

Column 40, line 43 "300-4000A" should read -- 3000-4000 A --.

Column 42, line 8 "cal./cm.$^2$/lash" should read
-- cal./cm.$^2$/flash --.

UNITED STATES PATENT OFFICE
CERTIFICATE OF CORRECTION

Patent No. 3,635,544   Dated January 18, 1972

Inventor(s) Robert Franz Stamm, Jacob Solomon Brinen, Evalyn Hosterman Tennant & Frederick Halverson It is certified that error appears in the above-identified patent and that said Letters Patent are hereby corrected as shown below:

Column 43-44, line 9 insert heading and title
-- EXAMPLES 1 to 77
WAVELENGTH REGIONS OCCUPIED BY TRIPLET-TRIPLET ABSORPTION BANDS USING PLASTIC MATRICES CONTAINING PHOTOCHROMIC MATERIALS --.

Column 44, No. 2 "Weakband" should read -- Weak band --.

Column 43-44, Example 39-44 "$5 \times 10^{=4}$" should read -- $5 \times 10^{-4}$ --.

Column 47, line 23 "or" should read -- of --.

Column 47, line 47 "1.22 x 10 quanta" should read -- $1.22 \times 10^{17}$ quanta --.

Column 48, line 22 "Table" should read -- Table 6 --.

Column 48, line 23 "$\varepsilon T'-T$" should read -- $\varepsilon_{T'-T}$ --.

Column 48, line 26 "$6 \times 10^{1164}$" should read -- $6 \times 10^{-4}$ --.

Column 48, line 27 "$3 \times 10^{-6} \times 10^{-3}$" should read -- $3 \times 10^{-3}$ $6 \times 10^{-3}$ --.

Column 48, line 31 "$7.5 \times 10^{-B\&2}$" should read -- $7.5 \times 10^{-2}$ --.

Column 48, line 47 before "specific" insert -- a --.

Column 49, line 21 "$3\mu to$" should read -- $3\mu$ to --.

UNITED STATES PATENT OFFICE
CERTIFICATE OF CORRECTION

Patent No. 3,635,544                     Dated January 18, 1972

Inventor(s) Robert Franz Stamm, Jacob Solomon Brinen,
            Evalyn Hosterman Tennant & Frederick Halverson It is certified that error appears in the above-identified patent and that said Letters Patent are hereby corrected as shown below:

Column 49, lines 48-49 omit "The T T cm., end faces were ground and polished."

Column 49, line 61 "sue" should read -- use --.

Column 49, line 75 "emitter" should read -- emitted --.

Column 50, line 1 "evaluate" should read ---evaluated --.

Column 50, line 9 "dibnez" should read -- dibenz --.

Column 50, line 62 "$\tau_m^{25\ C}$ (sec.) should read -- $\tau_m^{25°C}$(sec.)--,
and "$\tau_m^{78\ K}$ (sec.) should read -- $\tau_m^{78°K}$(sec.)--.

Column 51, line 12 "5 x $10^{-m}$" should read -- 5 x $10^{-4}$ M --.

Column 51, line 22 "(S'B)" should read -- (S'$_B$) --.

Column 51, line 23 "S'A" should read -- S'$_A$ --.

Column 51, line 36 "S'A" should read -- S'$_A$ --.

Column 51, line 37 "S'A" should read -- S'$_A$ --.

Column 51, line 41 "S'A" should read -- S'$_A$ --.

Column 51, line 27 "hereto" should read -- hetero --.

Column 52, line 55 "5 x $10^-$" should read -- 5 x $10^{-3}$ --.

Column 52, line 69 "5 x $10^-$" should read -- 5 x $10^{-4}$ molar)-dibenz[a,h]a- --.

UNITED STATES PATENT OFFICE
CERTIFICATE OF CORRECTION

Patent No. 3,635,544      Dated January 18, 1972

Inventor(s) Robert Franz Stamm, Jacob Solomon Brinen, Evalyn Hosterman Tennant & Frederick Halverson It is certified that error appears in the above-identified patent and that said Letters Patent are hereby corrected as shown below:

Column 52, line 71 after "T'" insert -- T absorption --.

Column 53, line 17 "polymethylacrylate" should read -- polymethylmethacrylate --.

Column 53, line 18 "1.05 x 10$^-$" should read -- 1.05 x 10$^{-3}$ --.

Column 53, line 34 "120105" should read -- 120    105 --.
                                                     3/4    16 1/2

Column 53, line 39 "$\lambda > 5,900A$" should read -- $\lambda < 5,900A$ --.

Column 54, line 3 "polymethylemthacrylate" should read -- polymethylmethacrylate --.

Column 55, line 2 "1.67 x 10$^-$M" should read -- 1.67 x 10$^{-4}$ M --.

Column 55, line 4 "naphthol" should read -- naphtho --.

Column 56, line 2 "(RRI(RRI-7,036)" should read -- (RRI-7,036) --.

Column 56, line 26 "caridin" should read -- acridin --.

Column 56, line 28 "(5x10$^-$M)" should read -- (5 x 10$^{-3}$M) --.

Column 57, line 61 for "temperature (10 25°C)" should read -- room temperature (∼25°C) --.

Column 58, line 37 in the table for the O.D. at $\lambda$ ($\mu$) 0.55 "5.8" should read -- 75.8 --.

UNITED STATES PATENT OFFICE
CERTIFICATE OF CORRECTION

Patent No. 3,635,544    Dated January 18, 1972

Inventor(s) Robert Franz Stamm, Jacob Solomon Brinen, Evalyn Hosterman Tennant & Frederick Halverson It is certified that error appears in the above-identified patent and that said Letters Patent are hereby corrected as shown below:

Column 59, line 41 "os" should read -- of --.

Column 62, line 55 before "crossing" insert -- intersystem--.

Column 62, line 71-72 "and the human eye is most sensitive. Namely" should read -- to which the human eye is most sensitive. --.

Column 63, line 7 "an d" should read -- and --.

Column 63, line 11 "anmely" should read -- namely --.

Signed and sealed this 29th day of August 1972.

(SEAL)
Attest:

EDWARD M. FLETCHER, JR.
Attesting Officer

ROBERT GOTTSCHALK
Commissioner of Patents